United States Patent [19]
Temma et al.

[11] Patent Number: 5,260,801
[45] Date of Patent: Nov. 9, 1993

[54] METHOD OF RECORDING AND REPRODUCING VIDEO FORMAT SIGNAL USING DIVISION VIDEO SIGNALS ON A PLURALITY OF RECORDING MEDIA

[75] Inventors: Tetsuya Temma; Yasuharu Nakajima; Hiroyasu Matsuura; Takeo Tobe; Jun Kono; Takuo Fujimura; Isao Kikuchi; Atsushi Takada, all of Tokorozawa, Japan

[73] Assignee: Pioneer Electronic Corporation, Tokyo, Japan

[21] Appl. No.: 705,820

[22] Filed: May 28, 1991

[30] Foreign Application Priority Data

Jun. 1, 1990 [JP] Japan .................. 2-143590

[51] Int. Cl.⁵ .............................. H04N 5/76
[52] U.S. Cl. ...................... 358/335; 358/342; 360/33.1; 369/47
[58] Field of Search .............. 358/310, 341, 342, 343, 358/335, 334; 360/33.1, 35.1, 27; 369/30, 32, 47, 48

[56] References Cited

U.S. PATENT DOCUMENTS 4,688,106 8/1987 Keller et al. .................. 358/342
4,989,206 1/1991 Dunphy, Jr. et al. ........... 371/10.1

FOREIGN PATENT DOCUMENTS 58-175183 10/1983 Japan .
63-175595 10/1983 Japan .

Primary Examiner—Tommy Chin
Assistant Examiner—Thai Tran
Attorney, Agent, or Firm—Foley & Lardner

[57] ABSTRACT

A video format signal recording and reproducing method wherein a plurality of division video signals are obtained by dividing a single video format signal and are recorded onto a plurality of recording media, set indication ID numbers are recorded. When the division video signals are reproduced from the recording media, the set indication ID numbers are automatically discriminated. Only when the set indication ID numbers coincide each other, the reproducing operation of the single video format signal is executed.

5 Claims, 24 Drawing Sheets

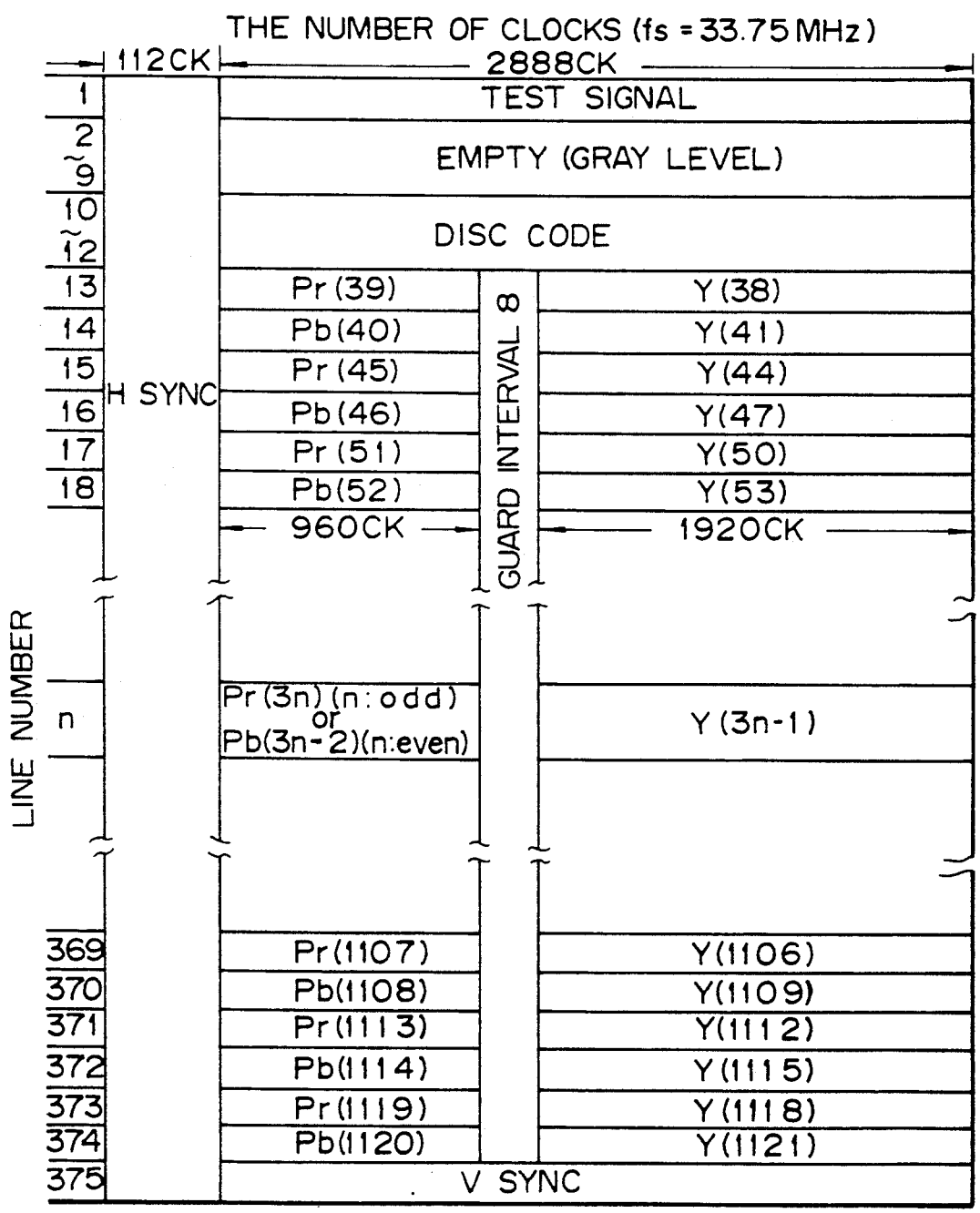

Fig. 12

HD-LD DISC CODE FORMAT
< PROGRAM AREA >

HORIZONTAL CHECK SUM

|     | X0 | X1 | X2 | X3 | X4 | X5 |
|-----|----|----|----|----|----|----|
| 12H | F  | FRAME NO. (BINARY) ||| |
| 11H | F  | FRAME NO. (BINARY) ||| |
| 10H | F  | VERTICAL HAMMING CODE ||| |

< LEAD-OUT AREA >

HORIZONTAL CHECK SUM

|     | X0 | X1 | X2 | X3 | X4 | X5 |
|-----|----|----|----|----|----|----|
| 12H | 8  | FRAME NO. (BINARY) ||| |
| 11H | 8  | FRAME NO. (BINARY) ||| |
| 10H | 8  | VERTICAL HAMMING CODE ||| |

< LEAD-OUT AREA >

HORIZONTAL CHECK SUM

|     | X0 | X1 | X2 | X3 | X4 | X5 |
|-----|----|----|----|----|----|----|
| 12H | 8  | 1D | LEAD-IN FRAME NO (BINARY) || |
| 11H | 8  | LEAD-IN TOC DATA ||| |
| 10H | 8  | VERTICAL HAMMING CODE ||| |

*1) THE FRAME NOS. START FROM NO.1 IN BOTH PROGRAM AREA AND LEAD-IN AREA.

2) FRAME NOS. IN LEAD-OUT AREA ARE A SERIES OF NOS. FROM THE PROGRAM AREA.

Fig. 13

| DATA ID | ADDRESS | CLASSIFICATION OF DATA | SIZE (BYTE) | ATTRIBUTES OF DATA | | | |
|---|---|---|---|---|---|---|---|
| 9 | 1 | NULL CODE | 34 | ASCII CODE | | | |
| 8 | 18 | USER'S DATA | 20 | ASCII CODE | | | |
| 7 | 28 | DISC TITLE | 30 | ASCII CODE | | | |
| 6 | 43 | CHAPTER ADDRESS | 198 | BINARY: HEAD FRAME NO. OF EACH CHAPTER | | | |
| 5 | 142 | DISC NO. | 10 | ASCII CODE | | | |
| 4 | 147 | DISC ID | 2 | BINARY | | | |
| 3 | 148 | DISC SIDE | 1 | DISC | 1 | 2 | 3 |
|   |     |           |   | SIDE 1 | 0 | 1 | 2 |
|   |     |           |   | SIDE 2 | 4 | 5 | 6 |
| 2 | 149 | LAST FRAME NO. | 2 | BINARY: 65535 OF LESS | | | |
| 1 | 150 | LAST CHAPTER NO. | 1 | BINARY: 90 OR LESS | | | |

※ 1) THE NULL CODE IS INSERTED INTO THE REMAINING PORTION IN THE SIZE.
2) THE DATA LESS THAN THE SIZE OF TWO BYTES IS OVERLAPPED TO THEREBY FROM TWO BYTES.

THE LEAD-IN INTERVAL IS SET TO 1200 FRAMES AND THE TOC DATA (CORRESPONDING TO 1500 FRAMES) ARE REPEATED EIGHT TIMES ADN MULTIPLEXED.

Fig. 15A

<TRANSMISSION DATA>

| NAME | THE NUMBERS OF BYTES | | MEANING |
|---|---|---|---|
| REQ (01H) | 1 | | TRANSMISSION REQUEST |
| AUDIO | 1 | | 0<br>1  1/L<br>2  2/R<br>3  STEREOPHONIC |
| ADRESS | 2 | | (FRAME NO.)<br>LEAD-IN -1200 ~ 0<br>PRAOGRAM 1 ~ n.*<br>LEAD-OUT n+1 ~ |
| TRAY | 1 | | 0  OPEN<br>1  PARK<br>2  PLAY |
| TEST | 1 | BIT | SLIDER, TRACK |
| | | bo | 1 TRACK OPEN |
| | | b1 | 1 SLIDER OPEN |
| SUM | 1 | | CHECK SUM |

* n : MAX. 3600

Fig. 15B

<RECEPTION DATA>

| NAME | THE NUMBER OF BYTES | MEANING |
|---|---|---|
| ERROR | 1 | NEGATIVE ERROR<br>0 END<br>POSITIVE CONTINUE |
| AUDIO | 1 | 0 MUTE<br>1 1/L<br>2 2/R<br>3 STEREOPHONIC |
| ADRESS | 2 | (CURRENT FRAME NO.)<br>LEAD-IN -1200 ~ 0<br>PROGRAM 1 ~ n *<br>LEAD-OUT n+1 ~ |
| MODE | 1 | 0 OPEN<br>1 NO DISC<br>2 CLOSE<br>3 PLAY<br>4 SEARCH |
| STATUS | 1 | BIT / SERVO STATE<br>b0  1  DISC CODE IMPOSSIBLE<br>b1  1  TILT ON<br>b3 b2   PICK UP  SLIDER/TRACK<br>　0  FREE  OPEN/OPEN<br>　1  STOP  OPEN/CLOSE<br>　2  SCAN  ON /**<br>　3  PLAY  CLOSE/CLOSE<br>b5 b4       SPINDLE<br>　0       STOP<br>　1       OFF<br>　2       ON<br>　3       LOCK<br>b6  1  FOCUSING ON<br>b7  1  FOCUSING LOCK |
| CODE | 2 | DISC CODE |
| KEY | 1 | BIT / KEY INPUT DATA<br>b0  STEP/R<br>b1  STEP/F<br>b2  SCAN/R<br>b3  SCAN/F<br>b4  DISP<br>b5  PLAY<br>b6  EJECT<br>b7  NO KEY |

* n : MAX. 3600
** OPEN/CLOSE UNSPECIFIED

METHOD OF RECORDING AND REPRODUCING VIDEO FORMAT SIGNAL USING DIVISION VIDEO SIGNALS ON A PLURALITY OF RECORDING MEDIA

BACKGROUND OF THE INVENTION

1. Field of the Invention

The present invention relates to a recording and reproducing method for dividing a single video format signal into a plurality of channels and recording onto a plurality of recording media and reproducing.

2. Description of the Related Art

In JP-A-63-175595, for instance, there has been disclosed an apparatus in which a video signal is, for example, frequency divided and the resultant division signals are recorded onto a set of video disks and, after that, the set of video disks are played by driving a set of players in parallel, and the resultant signals are synthesized to thereby display an image.

When the recorded signals are reproduced by playing a set of plurality of video disks as mentioned above, if even one different kind of disk is included in the set of video disks or the surface of the disk differs in spite of the correct set of the video disks, it is impossible to synthesize the signals from the disks and to reproduce the original signal and to display an image. However, it is troublesome for the user to discriminate the kinds of a plurality of disks and the disk surfaces in order to decide a correct combination of the disks and it is also likely to cause an error.

SUMMARY OF THE INVENTION

It is, therefore, an object of the invention to provide a recording and reproducing method which can automatically play a correct combination of a plurality of disks.

In a video disk signal recording and reproducing method by a plurality of recording media according to the invention, a single video format signal is divided to obtain a plurality of division video signals, each of the division video signals is recorded to each of a set of recording media, and upon reproduction, the set of recording media are simultaneously played, the division video signals obtained are synthesized, and the original single video format signal is obtained and displayed as an image, wherein upon recording, set indication identification (ID) signals are recorded onto the set of recording media, the set indication ID signals are read out of the recording media by a reproducing operation, and an image is displayed only in the case where the set indication ID signals which have been read out coincide with each other.

In the video format signal recording and reproducing method by a plurality of recording media according to the invention, the single video format signal is divided to thereby obtain a plurality of division video signals, and when each of the division video signals is recorded onto each of a plurality of recording media, set indication ID signals which are peculiar to the set are recorded, and upon reproduction, the set indication ID signals are read out, and the reproducing operation is executed only in the case where the set indication ID signals which have been read out coincide with each other.

BRIEF DESCRIPTION OF THE DRAWINGS

FIGS. 7A, 7B, and 7C are arrangement diagrams of recording signals on three discs which were recorded by the recording system of FIG. 1;

FIG. 12 is an arrangement diagram of disc codes in the recording signals shown in FIGS. 7A to 7C;

FIG. 13 is an arrangement diagram of lead-in TOC data of the disc codes shown in FIG. 12;

FIGS. 15A and 15B are tables showing transmission and reception data in the communication between the main controller and the player in the reproducing system of FIG. 8.

DETAILED DESCRIPTION OF PREFERRED EMBODIMENTS

An embodiment of the invention will be described in detail hereinbelow with reference to the drawings.

Figure 1:
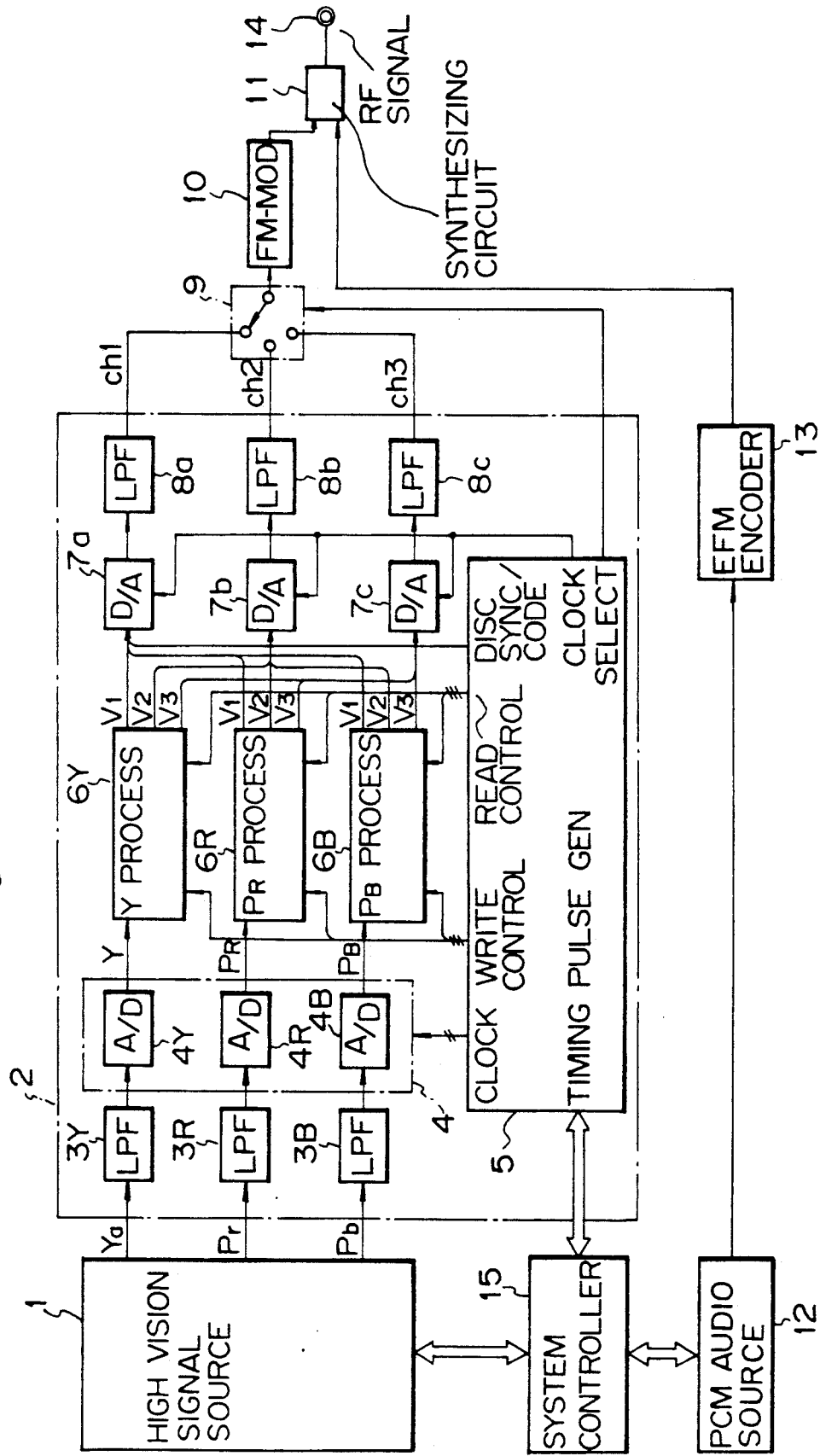
FIG. 1 is a block diagram of a recording system as an embodiment according to the invention.
Figure 2:
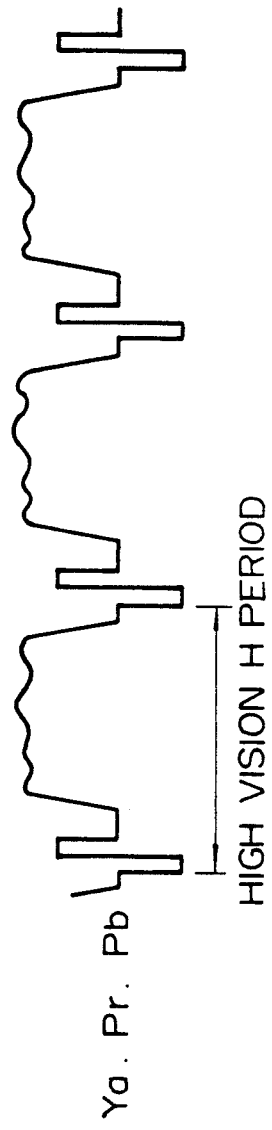
FIG. 2 is a waveform diagram of a high vision signal.

FIG. 1 is a constructional diagram of a system to divide a high vision signal into signals of three channels and record onto a recording medium (in this case, a laser video disc). In FIG. 1, analog signals of a luminance signal $Y_a$ and two kinds of color difference signals $P_r$ and $P_b$ are generated from a high vision signal source 1. The luminance signal $Y_a$ has a frequency band (hereinafter, referred to as a band) of 30 MHz. Each of the color difference signals $P_r$ and $P_b$ has a band of 15 MHz. FIG. 2 is a schematic diagram showing signal waveforms of $Y_a$, $P_r$, and $P_b$. A high vision H period denotes a period of a horizontal scanning line pulse and is set to about 29.63 $\mu$ sec, which is an inverse number of a line frequency of 33.75 kHz.

The high vision signals are supplied to an encoder 2 in FIG. 1. In the actual use, however, the bands as mentioned above are unnecessary and the luminance signal $Y_a$ is supplied to an A/D converter 4Y through a low pass filter 3Y of 22 MHz. The color difference signals $P_r$ and $P_b$ are supplied to A/D converters 4R and 4B through low pass filters 3R and 3B of 11 MHz, respectively. Sampling clocks in the A/D converter group 4 are supplied from a timing pulse generator 5. The A/D converter 4Y converts the analog luminance signal $Y_a$ into a digital luminance signal Y of eight bits by clocks of 74.25 MHz and supplies to a Y processing circuit 6Y. The A/D converters 4R and 4B convert the analog color difference signals $P_r$ and $P_b$ into 8-bit digital color difference signals $P_R$ and $P_B$ by clocks of 74.25/2 MHz (=37.125 MHz) and supply to a $P_R$ processing circuit 6R and a $P_B$ processing circuit 6B, respectively.

Figure 3:
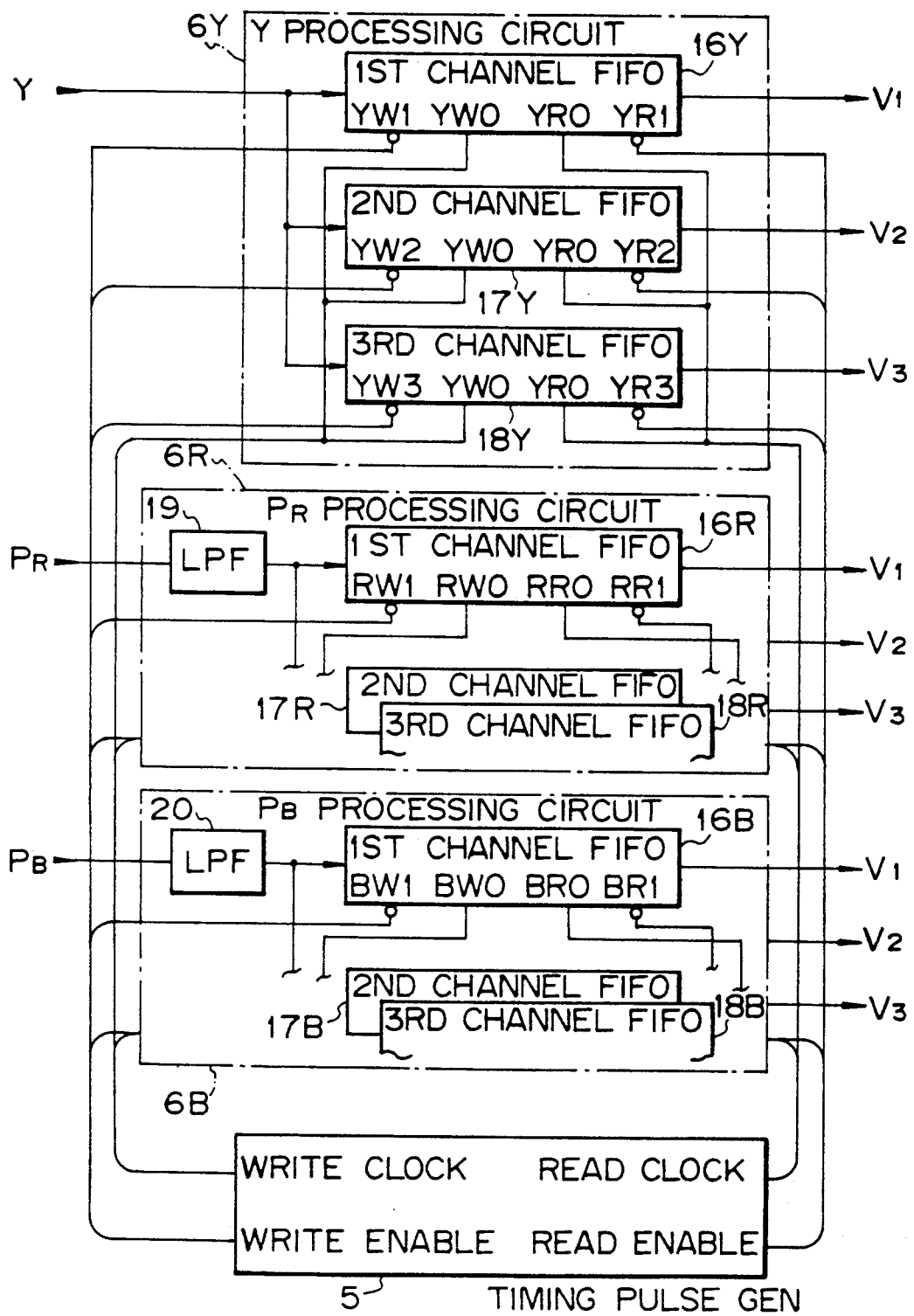
FIG. 3 is a block diagram of a part of the recording system of FIG. 1.

FIG. 3 is a further detailed block diagram of each of the processing circuits. The color difference signals $P_R$ and $P_B$ are subjected to what is called a line sequencing process to alternately transmit the signals every H lines. Therefore, to prevent an aliasing noise, digital pre low pass filters 19 and 20 in the vertical direction are provided in the $P_R$ processing circuit 6R and the $P_B$ processing circuit 6B.

Figure 4A:
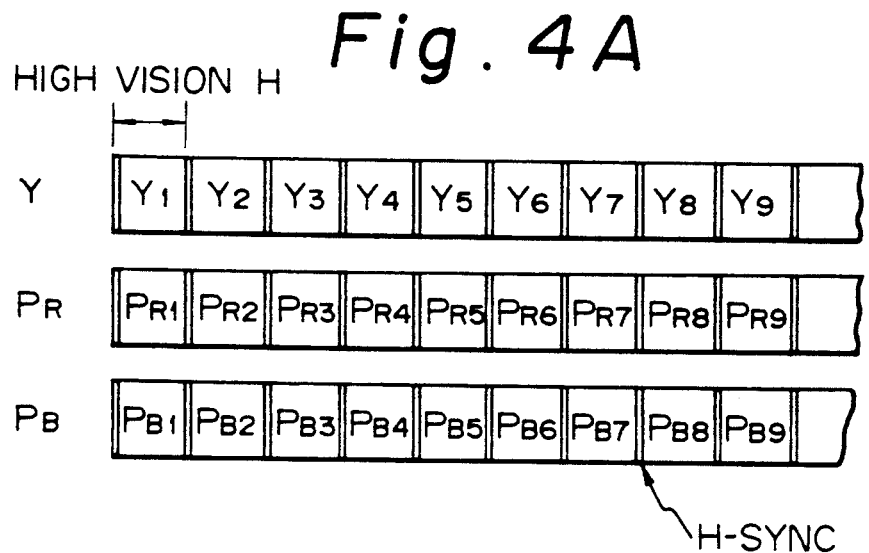
FIG. 4A is an arrangement diagram of a high vision signal.
Figure 4B:
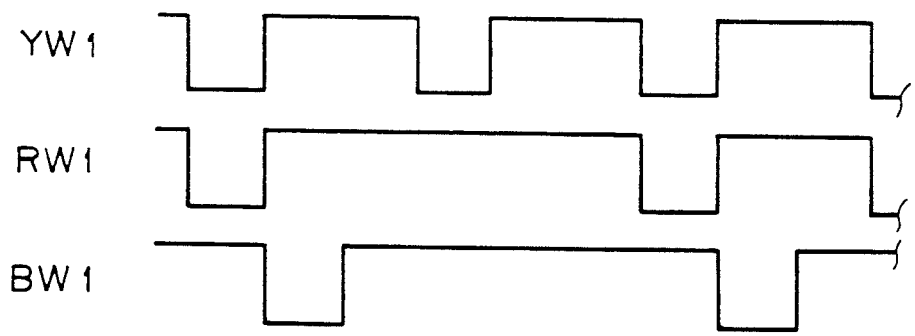
FIG. 4B is a time chart of control signals which are generated in the system of FIG. 1.
Figure 5A:
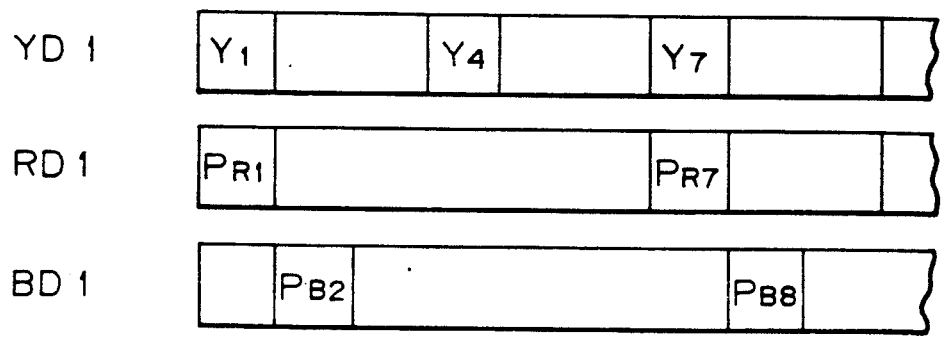
FIGS. 5A, 5B, 5C, and 6A are arrangement diagrams of signals in the system of FIG. 1.
Figure 5B:
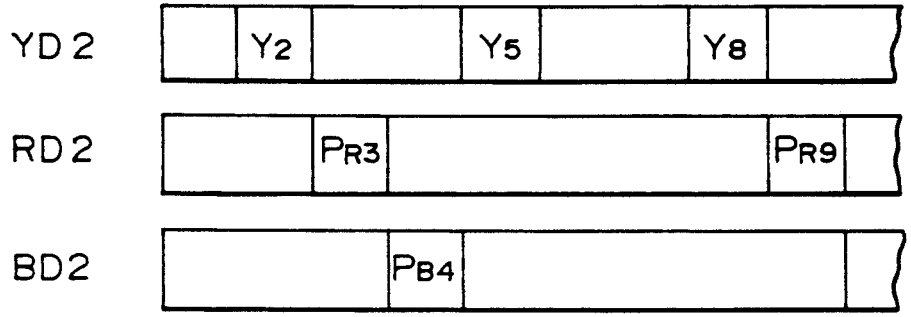
Figure 5C:
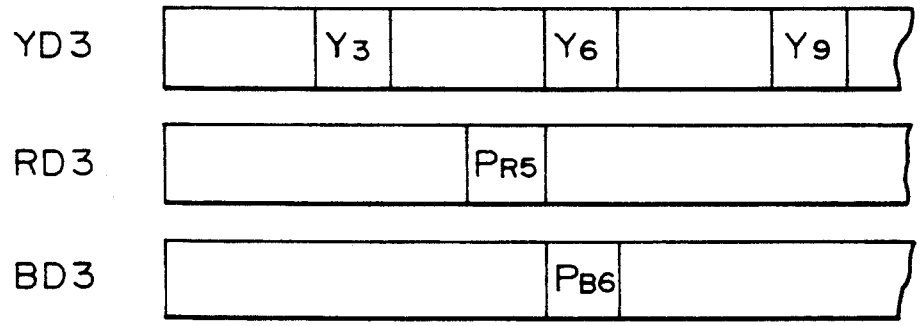

The luminance signal Y supplied to the Y processing circuit 6Y and the color difference signals $P_R$ and $P_B$ which were supplied to the $P_R$ processing circuit 6R and $P_B$ processing circuit 6B and transmitted through the pre low pass filters are written into first channel FIFOs 16Y, 16R, and 16B, second channel FIFOs 17Y, 17R, and 17B, and third channel FIFOs 18Y, 18R, and 18B by write clocks, write enable signals, and the like from the timing pulse generator 5. At this time, the sync signal component is eliminated, the line sequencing process is executed to the color difference signals, and the signals Y, $P_R$, and $P_B$ are distributed to first to third three channel signals on an H-line unit basis. FIG. 4(a) shows an arrangement of the A/D converted digital high vision signals Y, PR, and PB which are supplied to the processing circuits. FIG. 4(b) shows write enable signals $YW_1$, $RW_1$, and $BW_1$ to the first channel FIFOs 16Y, 16R, and 16B of each of the processing circuits. FIG. 5(a) shows an arrangement of luminance signal data $YD_1$ and color difference signal data $RD_1$ and $BD_1$ which are written into the first channel FIFOs 16Y, 16R, and 16B by the write enable signals. When comparing FIGS. 4(a) and 5(a), a sync signal component H-SYNC in FIG. 5(a) is eliminated and the signals of every three lines are written into the FIFOs. Further, the color difference signals $P_R$ and $P_B$ are alternately arranged due to the execution of the line sequencing process. FIGS. 5(b) and 5(c) show arrangements of the luminance signal data and the color difference signal data which are written into the second channel FIFOs 17Y, 17R, and 17B and the second channel FIFOs 18Y, 18R, and 18B, respectively. A writing rate into each FIFO is determined by the write clocks from the timing pulse generator 5. A frequency of write clocks YW$\phi$ of the luminance signal Y is set to 74.25 MHz. Frequencies of write clocks RW$\phi$ and BW$\phi$ of the color difference signals $P_R$ and $P_B$ are set to 74.25/2 MHz=37.125 MHz. On the other hand, read clocks for reading the signals from the FIFOs are given from the timing pulse generator 5. All of read clocks YR$\phi$, RR$\phi$, and BR$\phi$ of the luminance signal Y and color difference signals $P_R$ and $P_B$ are set to 33.75 MHz. A ratio between the write and read clocks is now obtained.

$$74.25 \text{ MHz} \div 33.75 \text{ MHz} = 2.2 \tag{1}$$

$$37.125 \text{ MHz} \div 33.75 \text{ MHz} = 1.1 \tag{2}$$

Figure 6B:
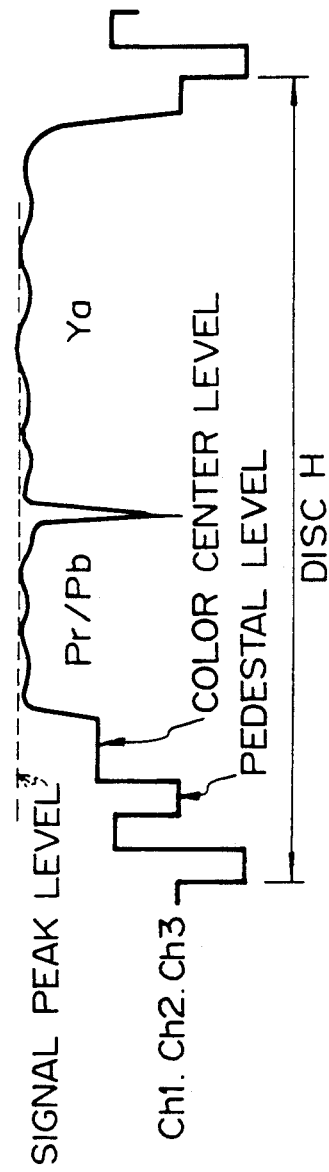
FIG. 6B is a waveform diagram of a signal in FIG. 1.
Figure 6A:
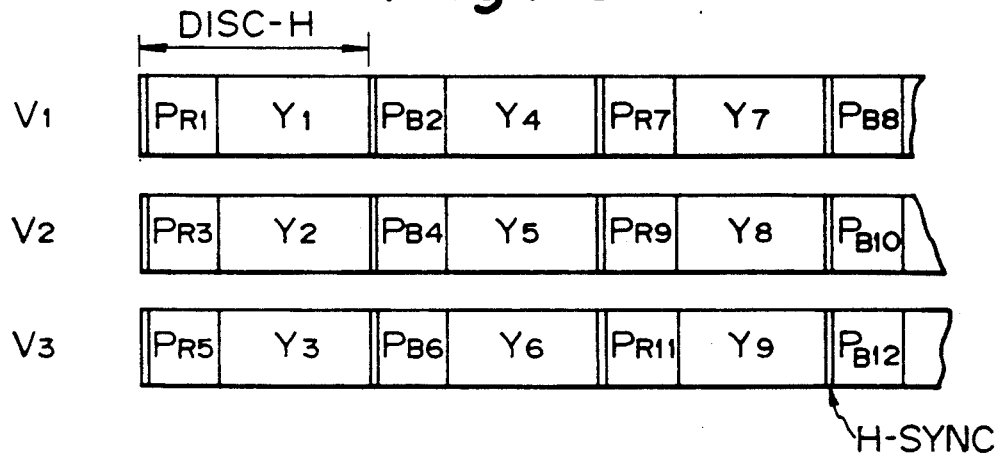

From the above equation (1), it will be understood that the time base with respect to the luminance signal Y was expanded 2.2 times. From the equation (2), it will be understood that the time base with regard to each of the color difference signals $P_R$ and $P_B$ was expanded 1.1 times. The signals which were time base expanded and distributed into three channel signals are generated as a first channel signal $V_1$, a second channel signal $V_2$, and a third channel signal $V_3$ by the first, second, and third FIFOs every processing circuit. The generated channel signals are synthesized every channel by wired-OR circuit (not shown). A disc sync signal and a disc code signal which are given from the timing pulse generator 5 are added to the synthesized signals. Thereafter, the resultant signals are supplied to D/A converters 7a, 7b, and 7c in FIG. 1. FIG. 6(a) shows an arrangement of the first to third channel signals $V_1$, $V_2$, and $V_3$ which are supplied to the D/A converters. In FIG. 6(a), as for the luminance signal Y, the sync signal component of about 3.77 $\mu$ sec in one H line of about 29.63 $\mu$ sec of the original high vision signal has been eliminated and the time base of about 25.86 $\mu$ sec of only the video signal component is expanded 2.2 times and the signal of about 56.89 $\mu$ sec is read out by the read clocks of 33.75 MHz.

$$56.69 \ \mu \text{ sec} \times 33.75 \text{ MHz} = 1920 \tag{3}$$

From the equation (3), it will be understood that the digital luminance signal components of $Y_1$, $Y_2$, ... in FIG. 6(a) are constructed by a unit basis of 1920×8 bits. Similarly, for the color difference signal components, $$25.86 \ \mu \text{ sec} \times 1.1 = 28.45 \ \mu \text{ sec} \tag{4}$$

$$28.45 \ \mu \text{ sec} \times 33.75 \text{ MHz} = 960 \tag{5}$$

From the equations (4) and (5), each of the digital color difference signal components of $P_{R1}$, $P_{R2}$, ..., $P_{B1}$, $P_{B2}$, ... in FIG. 6(a) is constructed by a unit basis of 960×8 bits. Further, a guard interval corresponding to eight clocks is provided between the luminance signal component and the color difference signal component.

On the other hand, the sync signals corresponding to 112 clocks are added.

$$1920 + 960 + 8 + 112 = 3000 \tag{6}$$

From the equation (6), the signals corresponding to 3000 clocks are set to a new one H line i.e. a disc-H period and supplied to the D/A converters 7a, 7b, and 7c. The three digital channel signals $V_1$, $V_2$, and $V_3$ each comprising the luminance signal component, color difference signal component, and sync signal or the disc code signal and sync signal are converted into the analog signals by the D/A converters 7a, 7b, and 7c at the timings of the clocks of 33.75 MHz which were given by the timing pulse generator 5.

Since the luminance signal in the band of 22 MHz has been time base expanded 2.2 times, a band of 10 MHz is sufficient when considering that 22 MHz÷2.2=10 MHz. Since the color difference signal of a band of 11 MHz has been time base expanded 1.1 times, a band of 10 MHz is similarly enough by considering that 11 MHz÷1.1=10 MHz. Therefore, unnecessary high frequency components after completion of the D/A conversion are cut out from outputs of the D/A converters 7a, 7b, and 7c by low pass filters 8a, 8b, and 8c of 10 MHz. Thus, three analog signals $ch_1$, $ch_2$, and $ch_3$ are generated from the encoder 2. FIG. 6(b) shows a schematic diagram of those output signal waveforms. The analog luminance signal component $Y_a$ and the analog color difference signal component $P_r$ or $P_b$ are synthesized in the disc-H period. In FIG. 6(a), a color center level is set to a value which is obtained by dividing an interval between a signal peak level and a pedestal level into two equal portions. Such a color center level is necessary to reproduce the video signal from the disc after completion of the recording.

The signals of the respective channels which were generated from the encoder 2 are supplied to a selecting circuit 9. One of the three channel signals $ch_1$, $ch_2$, and $ch_3$ is individually independently or sequentially selected and supplied to a frequency modulator 10. In the frequency modulator 10, the supplied channel signal is generated as an FM video signal of a low frequency within a range from 11.61 MHz to 14.91 MHz (having a deviation frequency of 3.3 MHz) and supplied to a synthesizing circuit 11.

A digital audio signal which was generated from a high definition digital (PCM) audio source 12 different from the high vision signal source 1 is supplied to an EFM encoder 13 and encoded and a resultant encoded output signal is supplied to the synthesizing circuit 11. In the synthesizing circuit 11, the FM video signal and the encoded digital audio signal are added to become one signal and the resultant signal is generated as an RF signal from an output terminal 14. A system controller 15 executes the above series of operation control.

Figure 7A:
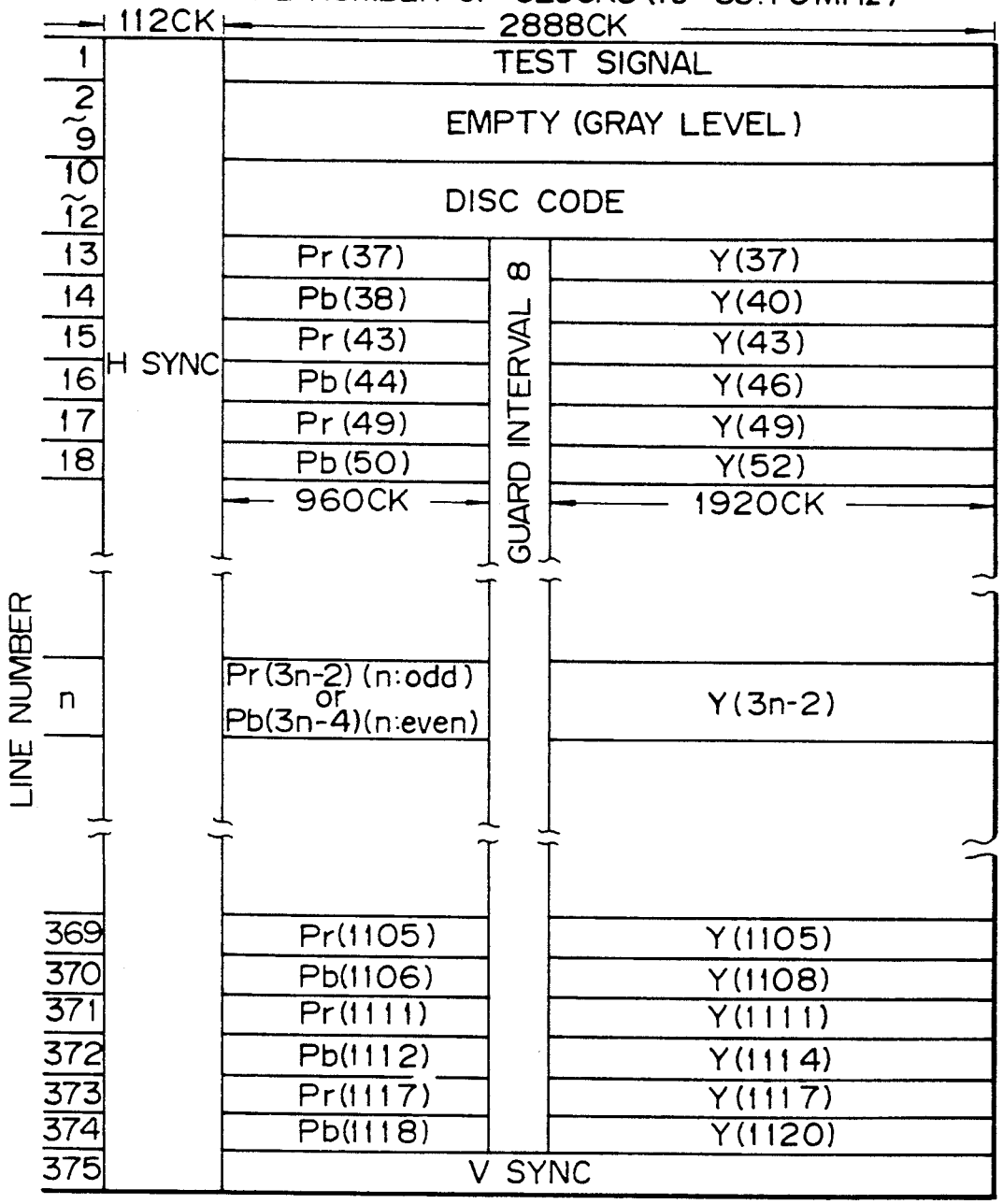
Figure 7C:
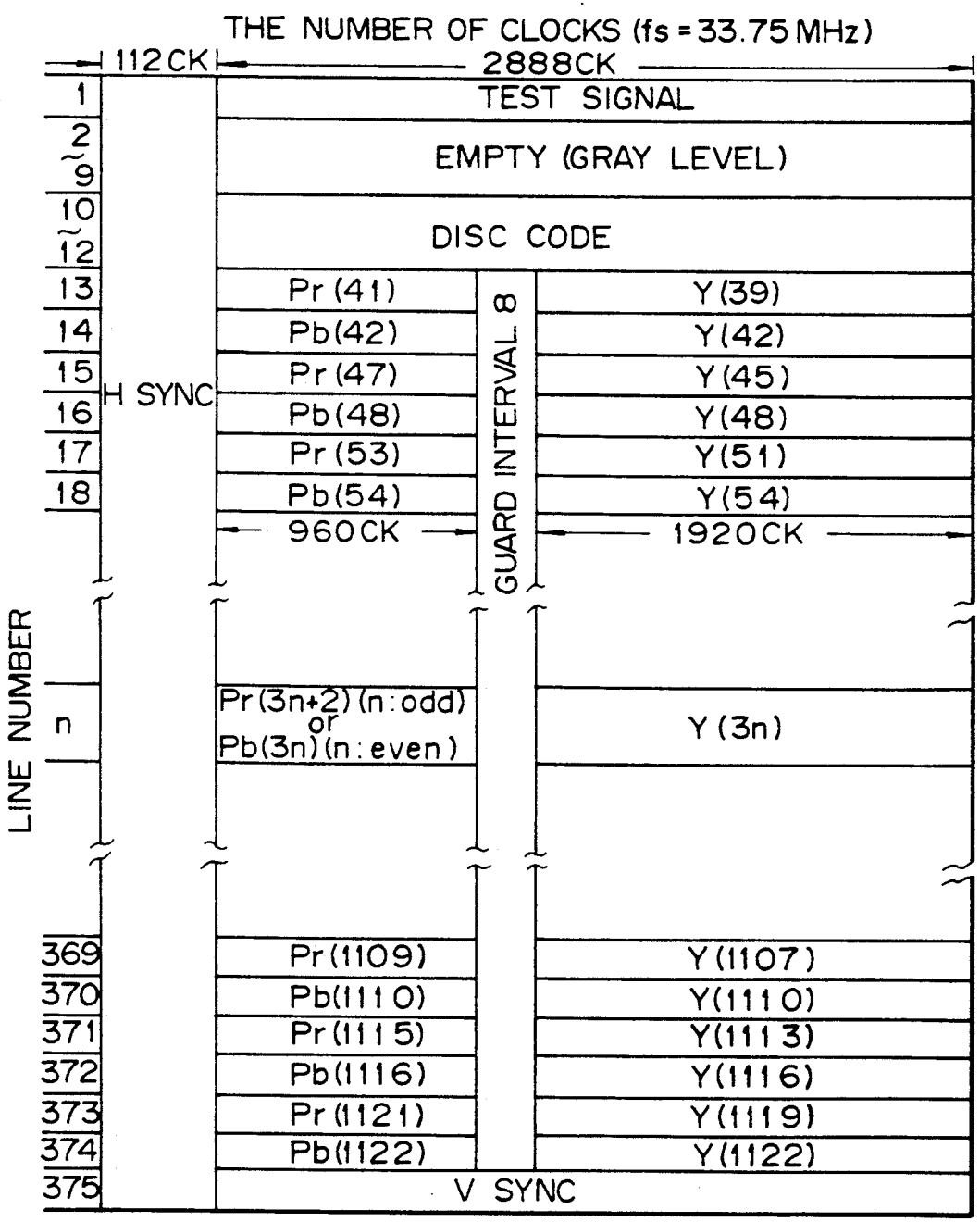

The RF signal generated from the output terminal 14 is amplitude limited by a limiter (not shown) and is shaped to a square wave. Thus, the RF signal becomes a multiplex signal in which a repetitive frequency indicates video signal information and a change in duty shows audio information. The signal which was shaped into the square wave is supplied to an optical modulator of a laser cutting machine (not shown) and the three channel signals are recorded onto three discs every channel. FIGS. 7(a), 7(b), and 7(c) show formats of the video signals recorded on three discs A, B, and C. In FIGS. 7(a) to 7(c), the line number indicates a number of a disc-H period in FIG. 6(b) and one frame comprises 375 lines.

$$375 \text{ lines} \times 3 = 1125 \text{ lines} \tag{7}$$

As will be obviously understood from the equation (7), the high vision signal of 1125 H lines per frame in which one set is constructed by three discs can be recorded.

In the embodiment, the high vision signal has independently been recorded to three discs. However, the high vision signal can be also simultaneously recorded to three tracks on one disc by using a cutting machine (not shown) having an optical modulator for generating three independent laser beams.

As mentioned above, the high vision signal of a wide band can be divided into three channel signals and can be independently recorded onto three discs as video signals of 10 MHz or less. Explanation will now provided in detail with respect to a method whereby the original high vision signal from a set of three recording discs on which the high vision signal was recorded is reproduced by three independent video disc players.

Figure 8A:
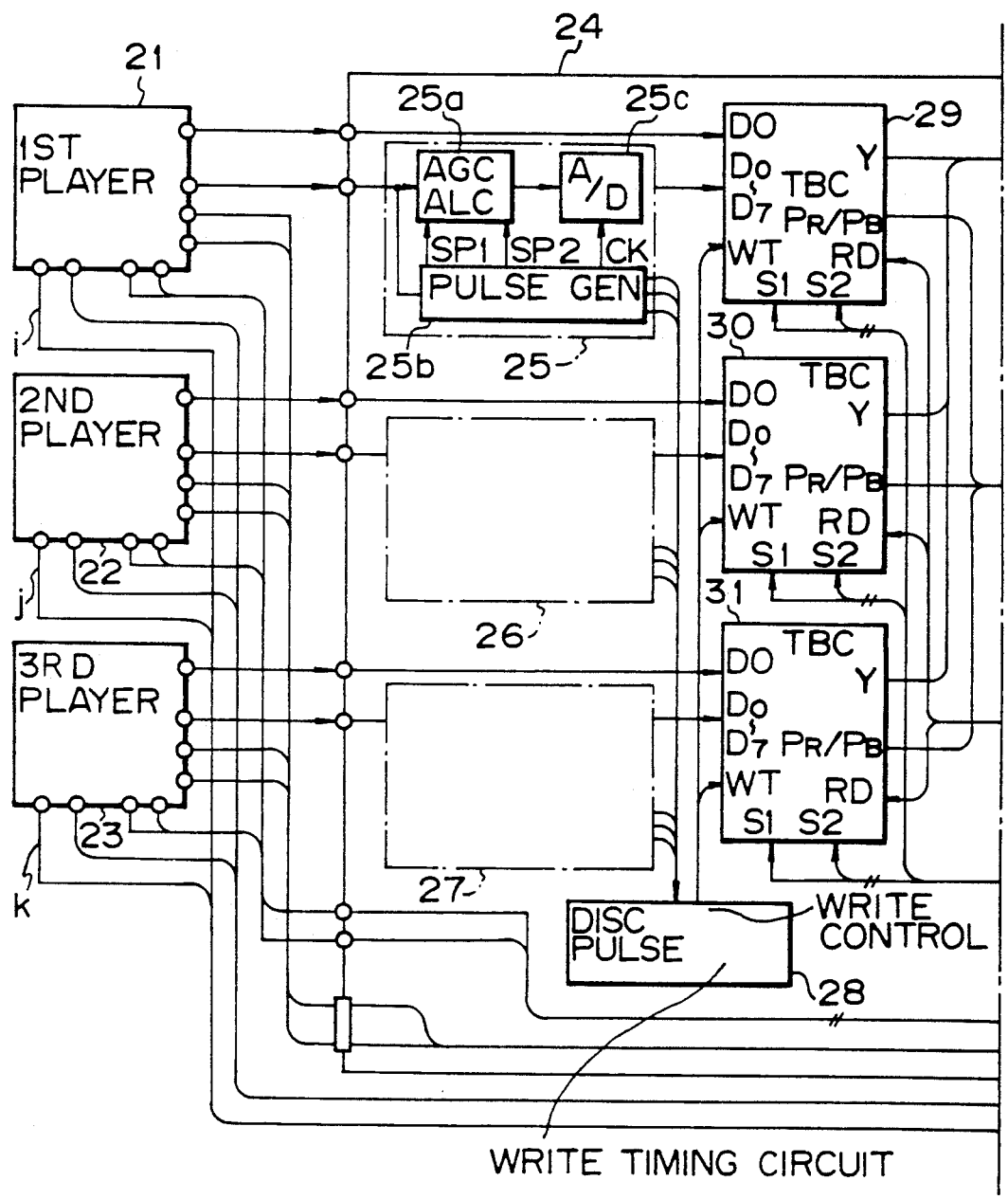
FIGS. 8A and 8B are block diagrams of a reproducing system of an embodiment according to the invention.
Figure 8B:
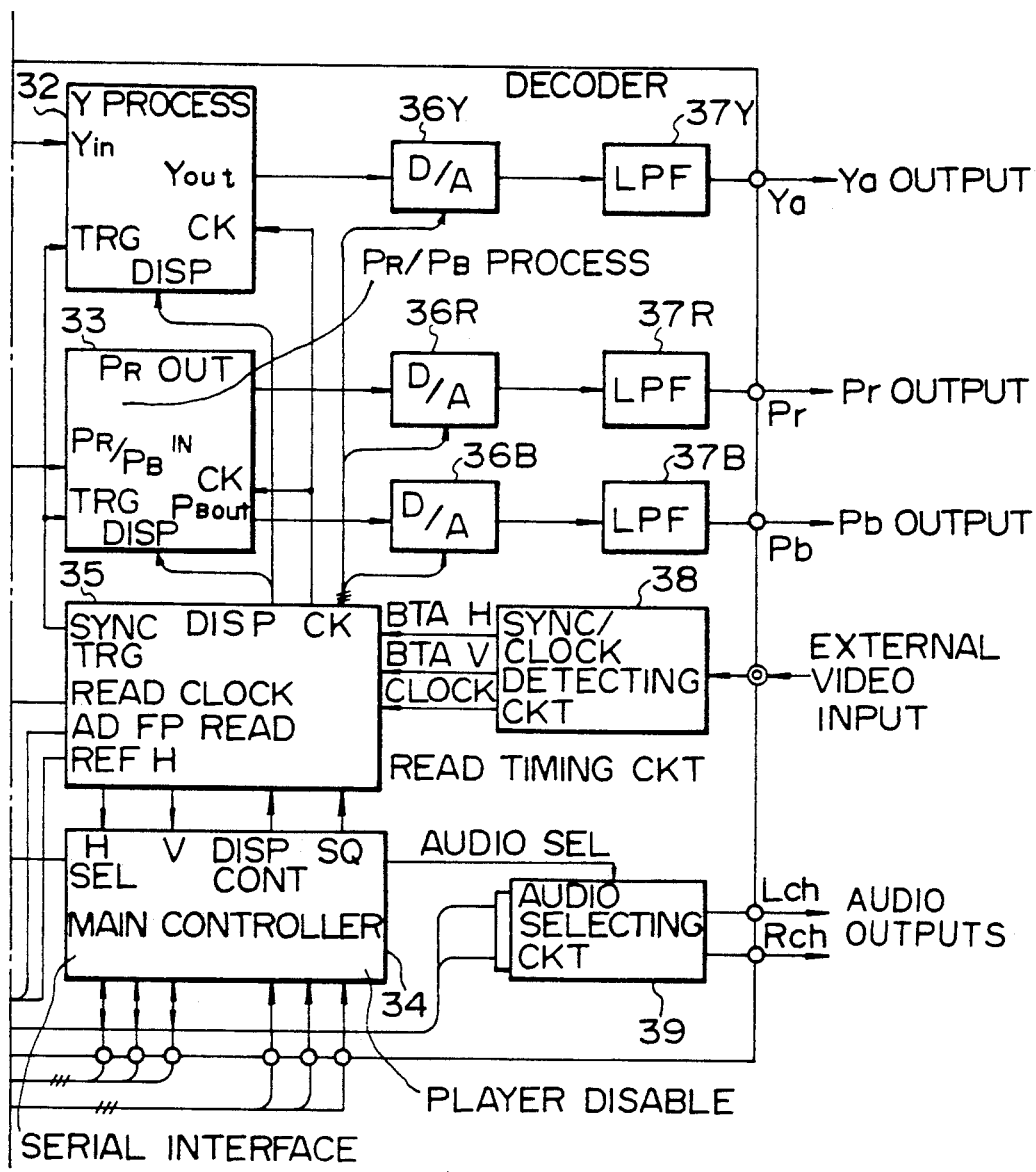
Figure 9:
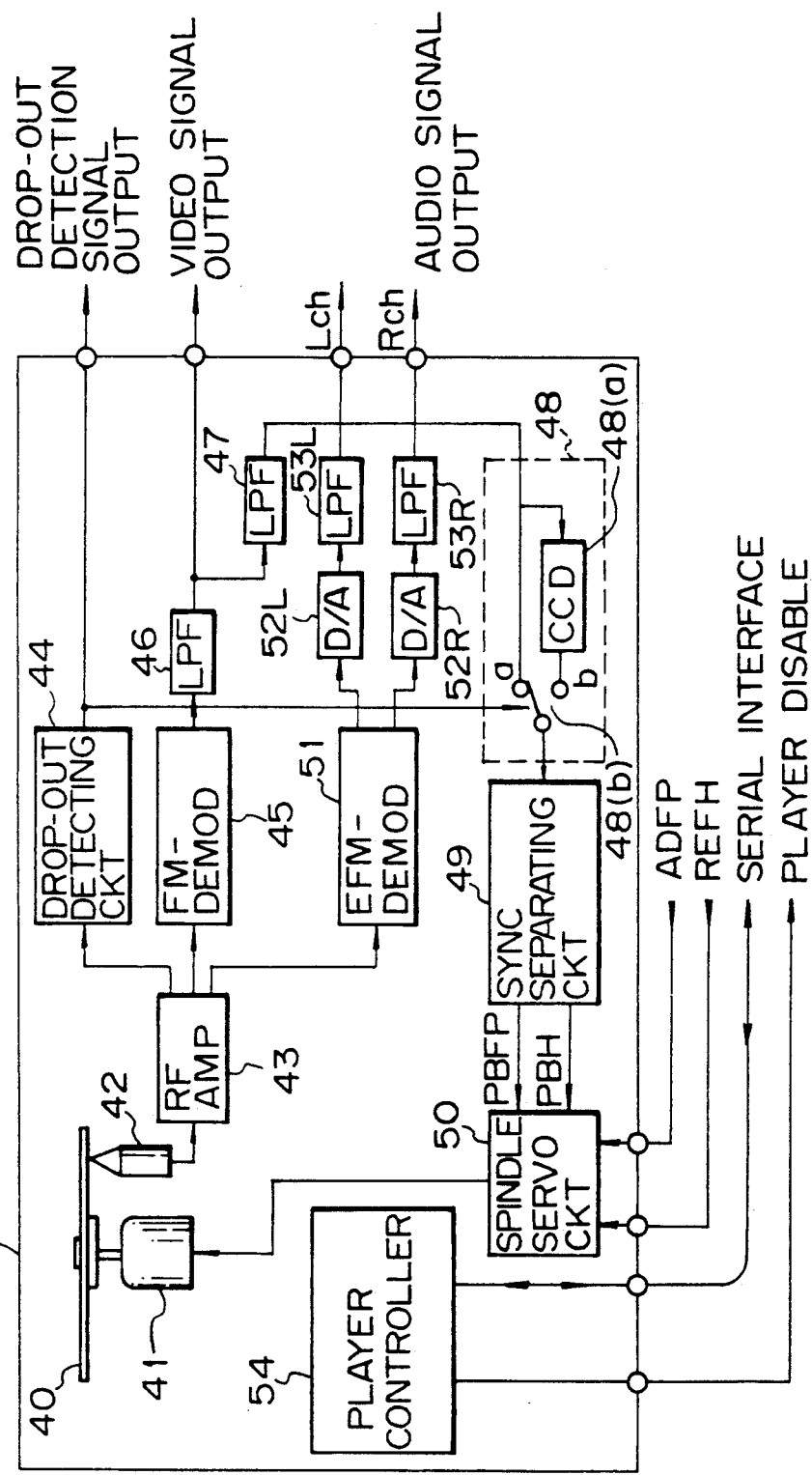
FIGS. 9, 10, and 11 are block diagrams of a partial circuit in FIGS. 8A and 8B.

FIGS. 8A and 8B are constructional diagrams of a system to reproduce a high vision signal. In FIGS. 8A and 8B, a first player 21, a second player 22, and a third player 23 simultaneously play a set of three recording discs on which a high vision signal was recorded and supply the reproduction video signals and the like to a decoder 24. FIG. 9 shows a construction of each player. A video disc 40 is rotated by a spindle motor 41 and a recording video signal is read by a pickup 42. The pickup 42 has therein a laser diode, an objective lens, a collimating lens, a focusing actuator, a tracking actuator, a photodiode, and the like. An output of the pickup 42 is supplied to an RF amplifier 43 and is also supplied to a focusing servo circuit (not shown) and a tracking servo circuit (not shown). An RF video signal which is generated from the RF amplifier 43 is supplied to a drop-out detecting circuit 44 and a frequency demodulator 45. The supplied RF video signal is demodulated by the frequency demodulator 45 and the demodulated output signal is generated from the player through a low pass filter 46. A reproduction output signal waveform is equivalent to that shown in FIG. 6(a). However, there is a case where what is called a signal drop-out occurs due to deposition of scratches or dust on the video disc 40 or the like. The drop-out detecting circuit 44 detects a signal drop-out and sets a detection output to the high [Hi] level for a drop-out detection period of time.

It is widely known that the signal drop-out can be compensated by using a CCD as an analog delay element for replacing the signal of one line before or the like and compensating. However, although the high vision signal of a wide band has been divided into three channel signals and the band has been narrowed as in the embodiment, a high speed CCD is necessary to compensate the reproduction video signal of a band of 10 MHz. Further, even if the replacement of the signal of one line before by the CCD was executed, enough good characteristics of the video signal cannot be obtained. In the decoder 24, the signal drop-out is compensated at the stage of the digital signal by using a line memory, which will be explained below. A sync signal component in the video signal is necessary to control the speed of the spindle motor 41 in the player. Therefore, an output of the low pass filter 46 is further transmitted through a low pass filter 47 of a low frequency and is supplied to a drop-out compensating circuit 48 for a sync signal. The drop-out compensating circuit 48 comprises a CCD 48a, a selecting circuit 48b, and the like. However, since the drop-out compensating circuit 48 executes the compensation of a sync signal of 11.25 kHz and a frame pulse signal of 30 Hz, a relatively low speed CCD 48a can be used.

A drop-out detection signal (hereinafter, abbreviated as a DOS) generated from the drop-out detecting circuit is supplied to the decoder 24 to compensate for the drop-out of the reproduction video signal and is also supplied to the selecting circuit 48b. When the DOS is at the low level, that is, when no drop-out occurs, the selecting circuit 48b is connected to the a side in the diagram and transfers the real-time video signal to a sync separating circuit 49. When the signal drop-out occurred, the DOS is set to the high level and the selecting circuit 48b is connected to the b side. The reproduction video signal of one line before from the CCD 48a is transferred to the sync separating circuit 49.

The sync separating circuit 49 separates and extracts a sync signal (PBH) and a frame pulse signal (PBFP) from the supplied video signal and supplies signals to a spindle servo circuit 50. Phases of the sync signal (PBH) and frame pulse signal (PBFP) which were supplied are compared with phases of a reference sync signal (REFH) and a reference frame signal (ADFP) which are supplied from the decoder 24 by the spindle servo circuit 50, respectively, thereby controlling the speed of the spindle motor 41.

On the other hand, an EFM audio signal component in the recording signal on the video disc 40 is supplied to an EFM demodulator 51 through the pickup 42 and RF amplifier 43. In the EFM demodulator 51, the processes such as EFM demodulation, error correction, and the like are performed. The processed signal is generated as 8-bit digital audio signals of L and R channels and supplied to D/A converters 52L and 52R. The digital audio signals are converted into the analog audio signals by the D/A converters 52L and 52R. The analog audio signals are generated from the player through low pass filters 53L and 53R.

The player controller executes the series of operation controls in the player mentioned above. The player controller is connected to the main controller in the decoder 24 by a serial interface. The communication with the main controller is executed by the serial interface at a period of the frame signal as what is called a V period as will be explained in detail hereinafter, thereby transmitting and receiving the necessary information. Further, when the operation of the player is abnormal, a player disable signal is soon generated to the main controller by a connecting line different from the serial interface irrespective of the V period.

In FIGS. 8A and 8B, the reproduction analog video signals of three channels of the output signal waveform as shown in FIG. 6(b) which were generated from three players are supplied to signal processing circuits 25, 26, and 27 including A/D converters in the decoder 24. The signal processing circuit 25 is constructed by an automatic level controller 25a, a pulse generator 25b, an A/D converter 25c, and the like.

Figure 10:
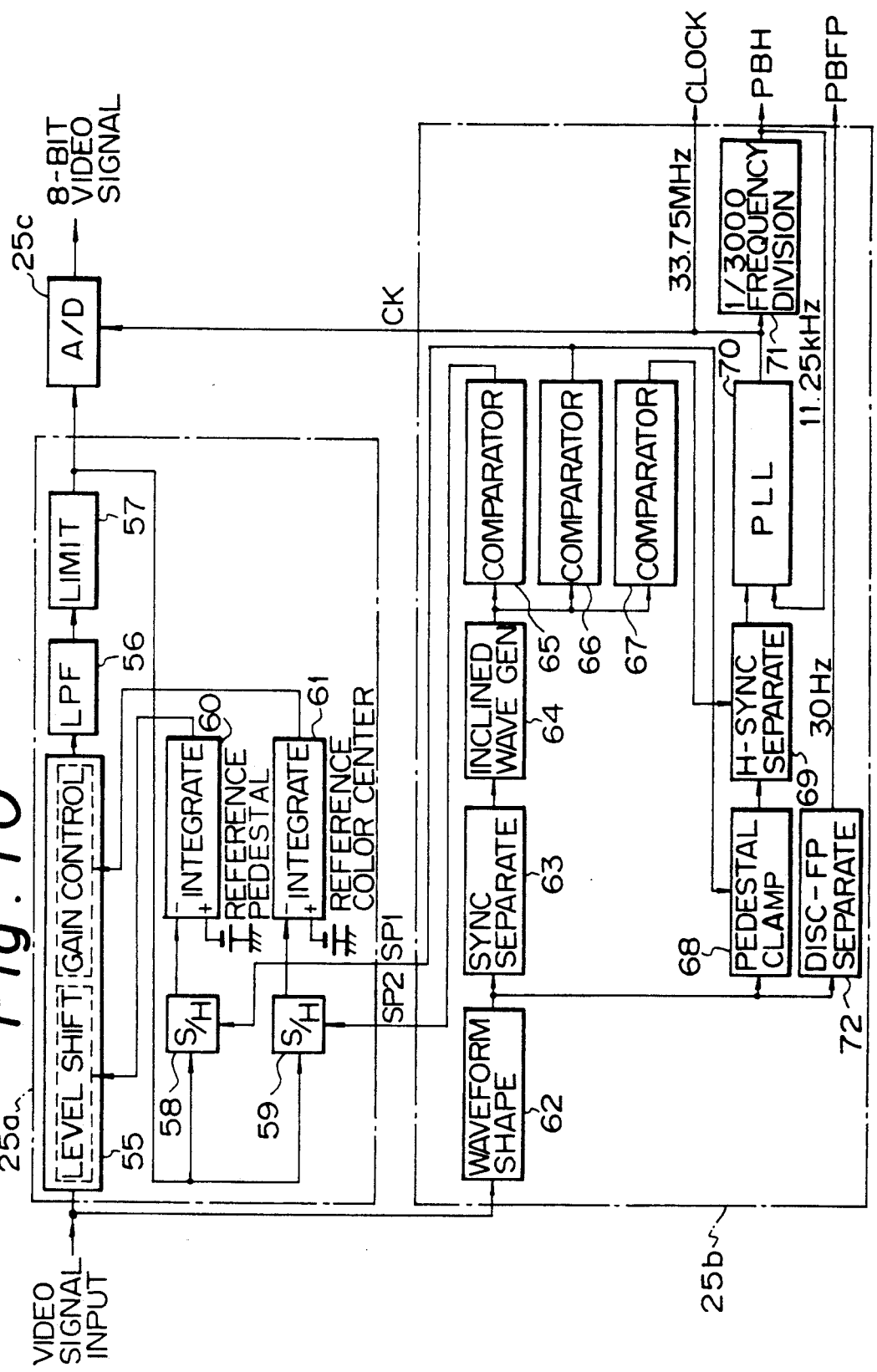

FIG. 10 is a diagram showing the signal processing circuit 25 further in detail. In FIG. 10, the supplied reproduction video signal is transferred to an ALC-/AGC circuit 55 as level shifting and gain controlling means. An output of the ALC/AGC circuit 55 is transmitted through a low pass filter 56 and supplied to a limiter 57 provided to prevent a trouble which will occur when the signal level is excessively high. An output of the limiter 57 is supplied to an A/D converter 25c and sample and hold (S/H) circuits 58 and 59. In the S/H circuit 58, a voltage of a pedestal level in FIG. 6(b) is held by a sampling pulse SP$_1$ and supplied to an integrating circuit 60. In the integrating circuit 60, the supplied pedestal level is compared with a reference pedestal level and a difference between them is integrated and supplied to the ALC/AGC circuit 55 via a limiter and the like (not shown). The pedestal level of the reproduction video signal is shifted so as to coincide with the reference pedestal level. Similarly, in the S/H circuit 59, a voltage of a color center level in FIG. 6(b) is held by a sampling pulse SP$_2$ and supplied to the signal processing circuit 55 through an integrating circuit 61. The color center level of the reproduction video signal is gain controlled so as to coincide with a reference color center level.

The reproduction video signal which is supplied to the ALC/AGC circuit 55 is also supplied to a waveform shaping circuit 62 and is subjected to processes such as amplification, filtering, impedance conversion, and the like. The processed signal is supplied to a sync separating circuit 63, a pedestal clamping circuit 68, and a disc frame pulse separating circuit 72. The sync signal which was separated by the sync separating circuit 63 is supplied to an inclined wave generator 64 through a drop-out sync gate circuit (not shown) to stop the transfer of the sync signal or the like when a signal drop-out occurs. In the inclined wave generator 64, the charging or discharging operation of a capacitor (not shown) is executed in accordance with the supplied sync signal, thereby generating an inclined wave and supplying to comparators 65, 66, and 67. Each of the comparators 65 and 66 is a window comparator to hold an output to the high or low level within a predetermined voltage range. Voltage ranges corresponding to the timings (times) to properly sample and hold the color center level and the pedestal level in FIG. 6(b) are respectively preset for the comparators 65 and 66. Since the inclined wave which is supplied to the comparator has a voltage level which is proportional to the elapse of time by using the sync signal as a time reference, proper sampling and holding operations are executed by supplying the outputs of the window comparators 65 and 66 to the sample and hold circuits 59 and 58 as sampling pulses SP$_2$ and SP$_1$.

A pedestal level of a signal from the waveform shaping circuit 62 which has been supplied to a pedestal clamping circuit 68 is clamped to a predetermined voltage level by the sampling pulse SP$_1$ as an output of the comparator 66, so that a DC signal is reproduced and supplied to an H sync separating circuit 69. Gate pulses before and after the leading edge of the sync signal are given to the H sync separating circuit 69 by the comparator 67. A leading point of a sync signal pulse is newly accurately detected within the range of the gate pulse. A pulse whose front edge is set to such a leading point is generated. The pulse output is supplied to a pulse width expanding circuit (not shown) and a trailing edge of the pulse is extended and supplied as one of two inputs of a PLL circuit 70. The PLL circuit 70 has therein a phase comparator, a loop filter, a limiter, a VCO to generate clocks of 33.75 MHz, and the like. An output of the VCO is supplied to a frequency dividing circuit 71 as an output of the PLL circuit 70. The clocks of 33.75 MHz are frequency divided into the clocks of 1/3000 of such a frequency by the frequency dividing circuit 71, so that pulses of 11.25 kHz are generated from the frequency dividing circuit 71. An output of the circuit 71 is supplied as another input of the PLL circuit 70 and is phase compared with the sync signal of 11.25 kHz from the reproduction video signal by a phase comparator. A phase difference signal is returned to the VCO, so that the clock pulses of 33.75 MHz which are synchronized with the sync signal of the reproduction video signal are produced and supplied to the A/D converter 25c. In the A/D converter 25c, the reproduction analog video signal is converted into the 8-bit reproduction digital video signal (hereinafter, simply referred to as a reproduction signal) by the clock pulses of 33.25 MHz. Since the pedestal level and the color center level have been adjusted to the reference levels in the ALC/AGC circuit 55, the pedestal level of the reproduction signal expressed by the hexadecimal notation after completion of the A/D conversion is set to [20]$_H$ and the color center level is set to [80]$_H$. Further, since the value of the color center level has been set to the value obtained by dividing the level between the signal peak level and the pedestal level into two equal portions upon recording, the peak value of the reproduction signal is set to [E0]$_H$. Thus, the values within a range from [E1]$_H$ to [FF]$_H$ (the maximum output value of the A/D converter) do not exist as reproduction signals.

In the disc frame pulse separating circuit 72, the frame pulses (PBFP) of the reproduction video signal are separated and extracted and generated as pulses of 30 Hz. Therefore, the clocks of 33.75 MHz and the sync signal (PBH) and disc frame pulses (PBFP) of 11.25 kHz are generated from the pulse generator 25b and supplied to a write timing circuit 28 in FIGS. 8A and 8B.

Signal processes which are substantially the same as the signal processes of the signal processing circuit 25 are also executed in the signal processing circuits 26 and 27 whose inner block diagrams are omitted in FIGS. 8A and 8B. The reproduction signals generated from the signal processing circuits 25, 26, and 27 of three channels are supplied to circuits (hereinafter, abbreviated to TBC circuits) 29, 30, and 31 to execute the time base compression and the time base correction. The write timing circuit 28 produces write control signals of three channels synchronized with the reproduction signals from the clocks, sync signals (PBH), and reproduction frame pulses (PBFP) of three channels and supplies to the TBC circuits 29, 30, and 31 of the channels, respectively.

The 8-bit reproduction signals supplied to the TBC circuits include a time base fluctuation (jitter) due to a decentering or the like of the disc, so that they are written into FIFOs (not shown) in the TBC circuits by the write control signals in which the reproduction signals are synchronized, that is, which include the jitter. Upon writing, the sync signal components and the like in the reproduction signals are deleted and only the video signal components are written into the FIFOs at the timings of the clocks of 33.75 MHz. Thus, in format diagrams of video signals shown in FIGS. 7(a), 7(b), and 7(c), the color difference signals corresponding to 960 clocks and the luminance signals corresponding to 1920 clocks from which the H sync lines and the guard interval among the lines within a range from the line number 13 to the line number 374 have been eliminated are written. Further, the FIFO for the luminance signal and the FIFO for the color difference signal are individually provided as FIFOs. Upon reading from the FIFOs, the luminance signal is time base compressed into 1/2.2 and the color difference signal is time base compressed into 1/1.1 and the time base compressed signals are generated. The luminance signal is supplied to a Y processing circuit 32 and the color difference signal is supplied to a $P_R/P_B$ processing circuit 33 by connecting the three channel signals by the wired-OR.

The DOSs (drop-out detecting signals) which were generated from the players 21, 22, and 23 are supplied to the TBC circuits. When a signal drop-out occurs, namely, when the DOS is at the high level, the value of $[FF]_H$ is written in place of the 8-bit reproduction signal having the values from $[20]_H$ to $[E0]_H$.

A main controller 34 gives a selection control signal (hereinafter, abbreviated to SEL) to the TBC circuits 29, 30, and 31 of three channels and controls the reading operations from the TBC circuits and controls the reading order of the reproduction signals of three channels which are supplied to the Y processing circuit 32 and the $P_R/P_B$ processing circuit 33.

A read timing circuit 35 generates read clocks having no time base fluctuation (jitter) and supplies to the TBC circuits. The reproduction signals which are time base compressed and read out by the read clocks, therefore, are supplied to the Y processing circuit 32 and the $P_R/P_B$ processing circuit 33 as reproduction signals from which the jitter was eliminated. Further, a sync trigger signal (SYNCTRG) generated from the read timing circuit 35 is given to ROMs provided in the Y processing circuit 32 and $P_R/P_B$ processing circuit 33 and the sync signals of the high vision signals are read out from the ROMs.

Figure 11:
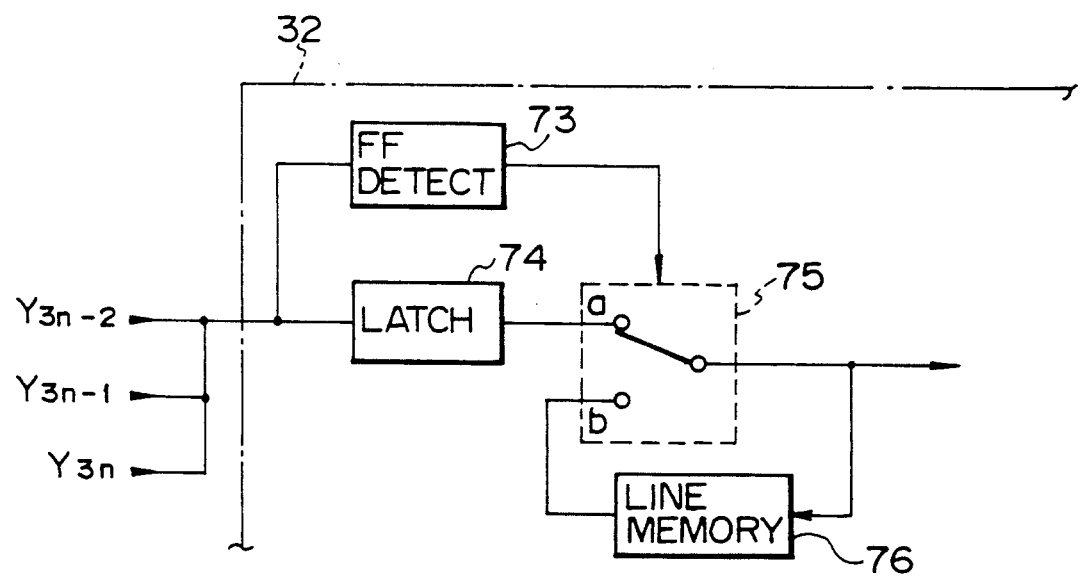

FIG. 11 is a block diagram of a section to execute signal discriminating and signal replacing processes in the Y processing circuit 32. In FIG. 11, a reproduction signal (hereinafter, abbreviated to a reproduction Y) of the luminance signal supplied from the signal lines of three channels which were connected by the wired-OR is supplied to an FF detecting circuit 73 and a latch circuit 74.

When the value of $[FF]_H$ is included in the reproduction Y supplied to the FF detecting circuit 73, such a value is detected. The output is held to the high level for a period of time of $[FF]_H$ and is held to the low level for a period of time other than the period of time of $[FF]_H$. The latch circuit 74 executes a time adjusting operation for delaying the supplied reproduction Y by only a time when the FF detecting circuit 73 performs the detecting operation and specifies the output and for transferring the delayed signal to the a side of a selecting circuit 75. The output of the FF detecting circuit is given to the selecting circuit 75. When the output of the FF detecting circuit is at the low level, the selecting circuit 75 is connected to the a side and an output of the latch circuit 74 is supplied to a line memory 76 and a circuit (not shown) at the next stage.

The line memory 76 delays the reproduction Y by the time corresponding to one line and supplies the output to the b side of the selecting circuit 75. When the output of the FF detecting circuit 73 is at the high level, the selecting circuit 75 is connected to the b side and the reproduction Y which is one line before is supplied to the circuit at the next stage and the line memory 76.

Therefore, when a signal drop-out occurs, the DOS is set to the high level and the reproduction Y is replaced to the value of $[FF]_H$ for such a high-level period of time. Therefore, for the period of time of $[FF]_H$, namely, the period of time of the signal drop-out, the portion in such a period in the reproduction Y of one line before is replaced, thereby compensating the signal drop-out.

Two circuits which are substantially the same as the circuit of FIG. 11 are also provided in the $P_R/P_B$ processing circuit 33 for the reproduction color difference signals $P_R$ and $P_B$ as well as in the Y processing circuit 32 and execute the same operation as that of the circuit of FIG. 11. Further, in the $P_R/P_B$ processing circuit 33, a line sequence recovering process of the line sequential color difference signals is executed by the following method. That is, with respect to the color difference signals $P_R$ and $P_B$, the arithmetic means of the signals of two continuous lines are calculated and an average value of the arithmetic means is inserted between the two lines, thereby interpolating. Since the video signal, particularly, the color difference signals have a strong line correlation, the original high vision signal can be sufficiently reproduced by such an interpolation.

The reproduction signals in which the signal dropout was compensated and the line sequence recovering process of the color difference signals were executed are generated from the Y processing circuit 32 and the $P_R/P_B$ processing circuit 33 as three reproduction signals of the reproduction luminance signal Y and reproduction color difference signals $P_R$ and $P_B$ and are supplied to D/A converters 36Y, 36R, and 36B.

Those three reproduction signals are the same as those in FIG. 4(a). However, the even-number lines of the $P_R$ signal and the odd-number lines of the $P_B$ signal are the arithmetic means of the line signals before and after those line signals. When a character multiplex command is given from the main controller 34 to the read timing circuit 35, character data (DISP) is supplied to the Y processing circuit 32 and $P_R/P_B$ processing circuit 33 from a character ROM (not shown) in the circuit and is superimposed to the reproduction signals and is generated.

The (digital) reproduction signals supplied to the D/A converters 36Y, 36R, and 36B are converted into the analog reproduction signals. The luminance signal $Y_a$ is supplied to a low pass filter 37Y of 22 MHz. The color difference signals $P_r$ and $P_b$ are supplied to low pass filters 37R and 37B of 11 MHz. The unnecessary high frequency component, noise, and the like are eliminated by each of the low pass filters and the resultant signal is generated from the decoder. The generated analog signals $Y_a$, $P_r$, and $P_b$ are supplied to a color display (not shown) and the high vision signals are reproduced and displayed.

It is an essential condition that a combination of a set of three recording discs of the high vision signals is correct. For this purpose, in three players 21, 22, and 23, it is necessary to discriminate the kinds of discs when starting the playing operation of the discs. Such a discrimination is performed by disc codes which indicate the recording signal in one frame and have been recorded in line numbers 10 to 12 shown in FIGS. 7(a), 7(b), and 7(c). FIG. 12 shows HD-LD disc code formats showing the contents of the disc codes. In the embodiment, a CAV (constant angular velocity) disc is used. In FIG. 12, a lead-in area corresponds to 1200 inner rim frames in the recording section. Lead TOC (Table of Contents) data of two bytes is included in the eleventh line in the lead-in area. FIG. 13 shows the contents of the TOC data. Necessary TOC information has been recorded on a 300-byte unit basis. Since the TOC of two bytes is provided for one frame, one TOC information unit is constructed by 150 frames. In the classification of the TOC data, a disc ID denotes an absolute number which is peculiar to the disc (also including the front and rear sides).

Figure 14:
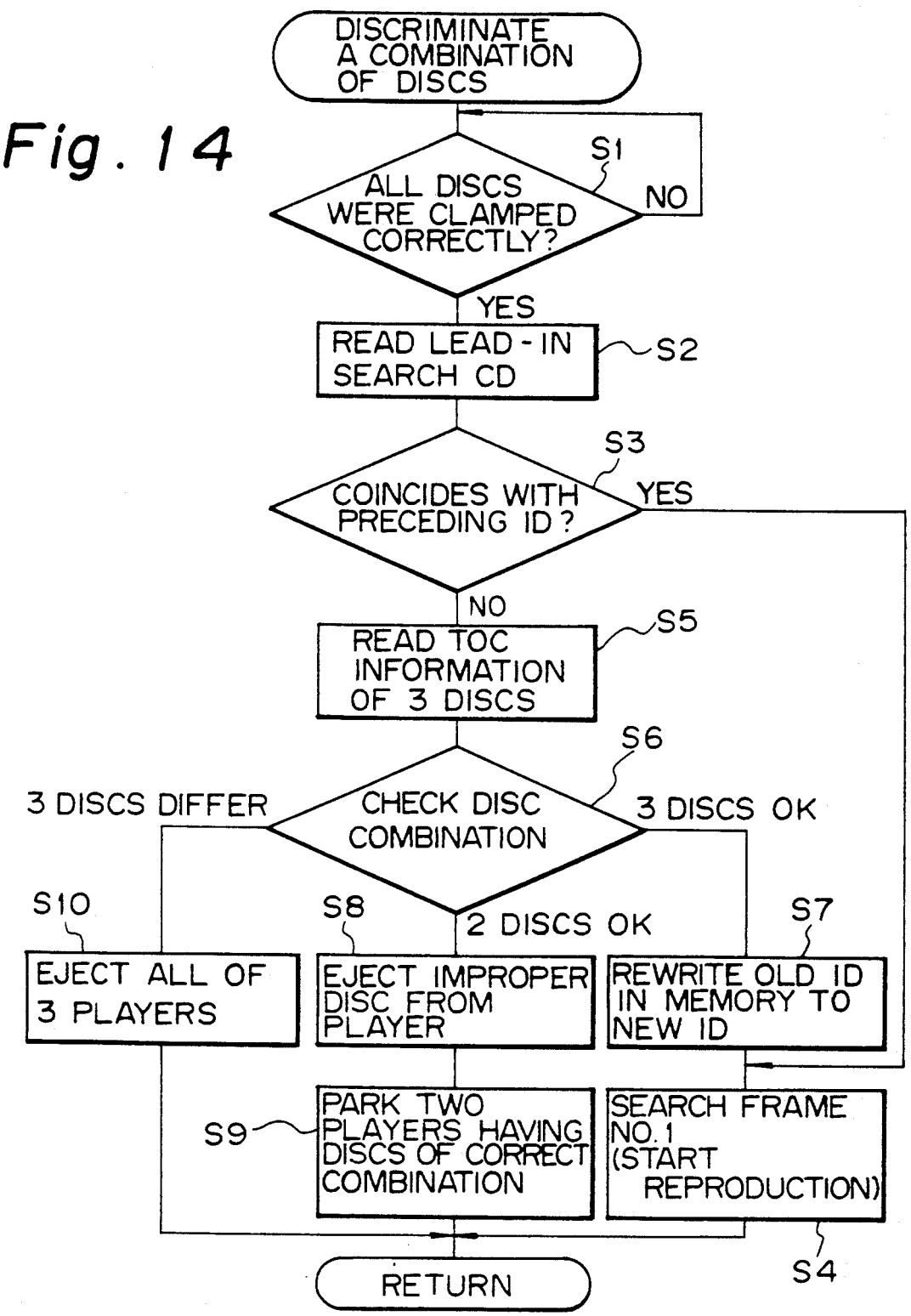
FIGS. 14, 15C, 16A, 17A, and 18A are flowcharts for subroutines which are executed by a main controller in the reproducing system of FIGS. 8A and 8B.

The TOC information is read by the players and communicated at the v period with the main controller 34 via the serial interface as mentioned above, so that the TOC information and the other necessary information are transmitted and received. The operations in the disc combination discriminating subroutine which are executed by the main controller 34 will now be described with reference to FIG. 14.

When three discs are loaded into the players, the main controller 34 advances to step S1 and waits for the reception of information indicating that all of the three discs have been clamped. If it is determined that all of the three discs have been clamped, the lead-in frame is searched and a command to read the disc ID is transmitted (step S2). After the disc ID was received, a check is made to see if the ID number coincides with the ID number which has been stored in the memory when the discs were played at a preceding time or not (step S3). If it is decided that the present ID number coincides with the preceding ID number, the disc ID denotes the absolute number which is peculiar to the discs and it has already been known that a combination of three discs is correct as a result of the preceding disc playing operation. Therefore, a command to search the frame of the frame No. 1 is transmitted to soon start the reproduction (play) without reading the other TOC information (step S4). Then, the processing routine advances to the main routine. If it is determined that the present ID number differs from the preceding ID number, a command to newly read the TOC information of three discs is transmitted to the players (step S5). If the read TOC information has been received from each player, the data of the disc numbers and disc sides in the TOC information are compared and analyzed, thereby discriminating the coincidence regarding the disc numbers and disc sides of three discs (step S6). If it is determined that the data of the disc numbers and disc sides of three discs coincide, the ID numbers of three discs are stored into the memory in place of the old ID numbers (step S7). Then, step S4 follows and a command to start the reproduction (play) is transmitted. If it is decided that the disc numbers and disc sides of only two of the three discs coincide and the disc number or disc side of the remaining one disc differs, a tray open (eject) command is transmitted to the player in which such a different disc has been loaded (step S8). A park (stop) command is transmitted to the other two players in which the correct discs having the coincident data were loaded (step S9) and the main routine is started. If it is determined that the data of the disc numbers or disc sides of all of the three discs differ, the tray open (eject) command is transmitted to all of the three players (step S10). Then, the processing routine advances to the main routine.

In addition to the TOC information, the information indicative of the operating states of the players and the like are transmitted and received between the main controller 34 and the players (controllers) via the serial interface and the player disable signal lines. FIG. 15(a) shows transmission data to give commands from the main controller 34 to the players 21, 22, and 23. "TRAY" data is set to the open state when it is "0", the park state for "1", and the play (reproducing) state for "2". "ADDRESS" data denotes a frame number and is made effective in the play state and a command to reproduce the transmitted frame is supplied to each player.

On the contrary, reception data as shown in FIG. 15(b) is supplied to the main controller 34 from each player.

"ERROR" data is set to a positive number when the pickup of the player is searching the designated frame of the designated frame number which was transmitted from the main controller 34. "ERROR" data is set to "0" when the pickup is located over the designated frame. "ERROR" data is set to a negative number if the spindle lock is released. "ADDRESS" data in FIG. 15(b) denotes the frame number at the present position of the pickup of the player.

In the normal playing mode, the main controller 34 transmits the same frame number to each player. When the frame number received from each player coincides with the transmitted frame number, the reproduction signal of the player is generated. If they differ, the player having different frame number squelches the reproduction signal.

Figure 15C:
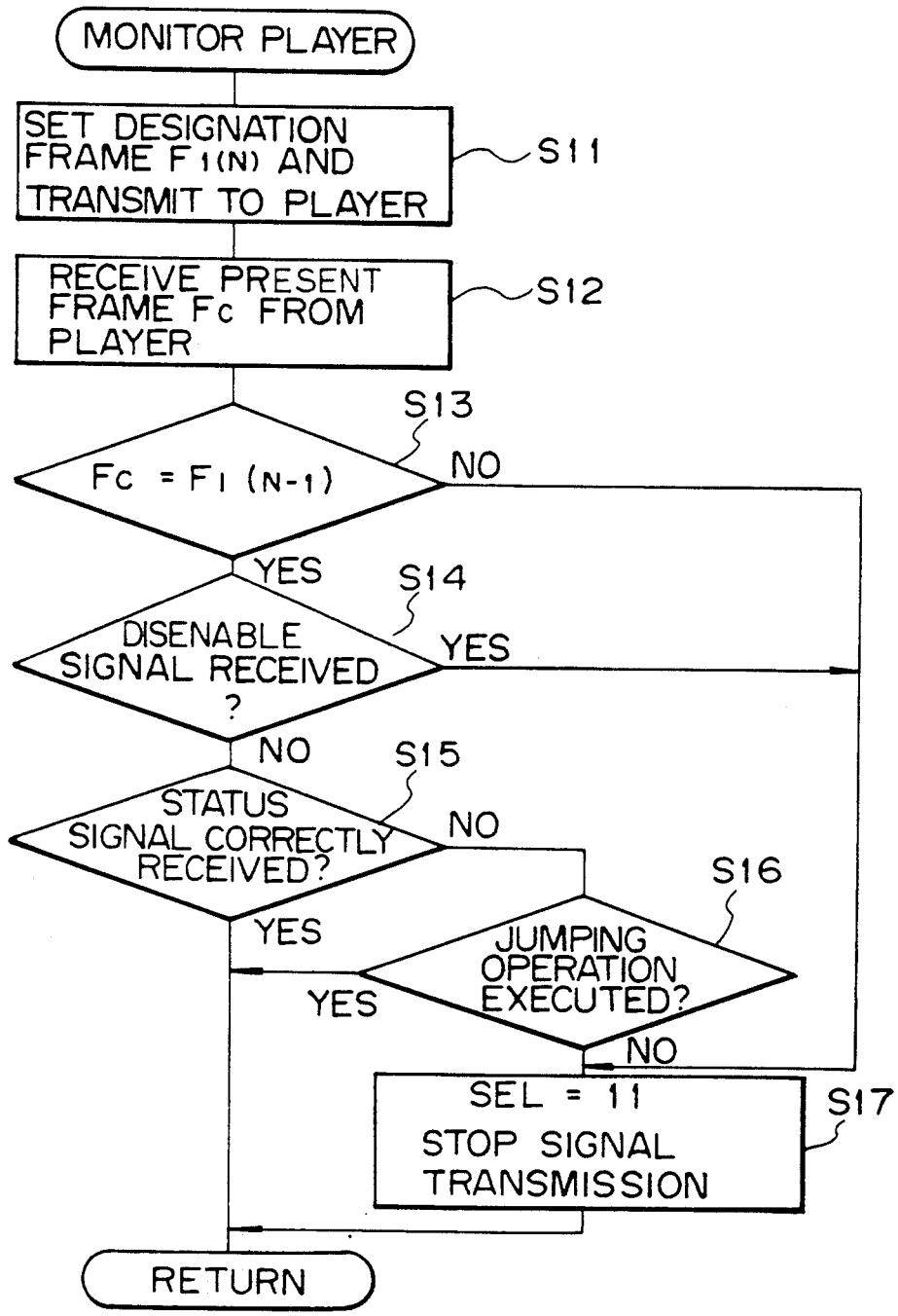

The operation to execute the squelch control by monitoring the player which is executed by the main controller 34 will now be described with reference to FIG. 15(c). When the player monitoring subroutine is started, the main controller 34 sets a designation frame $F_{I(N)}$ and transmits to each player (step S11) and receives a present position frame $F_C$ from the player within the same V period of time (step S12). Since the designation frame number corresponding to $F_C$ is equal to $F_{I(N-1)}$ which has been transmitted for the preceding V period, a check is made to see if $F_C$ coincides with $F_{I(N-1)}$ or not (step S13). If they coincide, a check is made to see if disable signals have been received through player disable lines i, j, and k or not (step S14). If it is determined that none of the disable signals is received, "STATUS" information of the players is discriminated (step S15). The "STATUS" information shows servo states of the slider servo, tracking servo, spindle servo, and focusing servo of the player. If it is decided in step S15 that the servo state (status) is normal, the processing routine advances to the main routine without performing the squelching operation. If it is determined that the servo state is not normal, there is a difference in level of the abnormal state depending on whether the servo state is in trouble or in the so-called specific reproduction mode. For instance, the slider servo and the tracking servo are closed in the normal state. However, in the case of a special reproducing mode including a jumping operation like a scanning operation, the tracking servo is repetitively set into the closed state and the open state. In step S16, a check is made to see if such a jumping operation is included or not. If it is determined that the jumping operation is included, the main routine is started without performing the squelching operation. If the jumping operation is not included, the servo state is decided to be abnormal. Both two bits of the 2-bit SEL signal in the main controller 34 are set to the high level $[11]_B$, thereby executing the squelching operation (step S17). If it is determined in step S13 that the designation frame differs from the present position frame, step S17 follows. If the disable signal has been received in step S14, the processing routine soon advances to step S17 (without waiting for the communication at the V period) and the squelching operation is performed.

Two bits ($S_1$, $S_2$) of the SEL signal are given to the TBC circuits 29, 30, and 31 in FIGS. 8A and 8B and are set to four kinds of binary values of $[00]_B$, $[01]_B$, $[10]_B$, and $[11]_B$, respectively. Even if a combination of three discs is correct, the main controller 34 must discriminate which discs were loaded into three players.

In FIGS. 7(a), 7(b), and 7(c), the numbers in ( ) subsequent to the signal Y, $P_r$, or $P_b$ indicate the line numbers of the original high vision signals. In the case of FIG. 7, the high vision signals have been recorded in accordance with the order of disc A - disc B - disc C. Therefore, to synthesize the reproduction signals of three channels in accordance with the correct order, the SEL signal of the TBC circuit to which the reproduction signal of the disc A was supplied is set to $[00]_B$. The SEL signals of the TBC circuits to which the reproduction signals of the discs B and C were supplied assume $[01]_B$ and $[10]_B$, respectively. In the case of executing the squelching operation, the SEL signals are set to $[11]_B$ as mentioned above.

The operation of the subroutine of the main controller 34 for allowing three players to be played and reproducing the signals and searching by jumping will now be described with reference to FIG. 16(a).

After the main controller 34 started the searching operation, the main controller advances to step S18 and sets a search target frame $F_{TF}$. Then, temporary target frames $F_{1TT}$ and $F_{2TT}$ of the first and second players 21 and 22 are commanded as target frames $F_{TF}$ and a temporary target frame $T_{3TT}$ of the third player 23 is commanded as the present frame $F_C$ (step S19). That is, the jumping operations are preferentially executed for the first and second players 21 and 22 and a still image of the present frame $F_C$ is generated from the third player 23. Then, the SEL signals of the first and second players 21 and 22 are set to $[11]_B$ (step S20), thereby performing the squelching operation. A check is then made to see if the jumping operation has been finished or not, that is, the present frames $F_{1C}$ and $F_{2C}$ of the first and second players coincide with the target frame $F_{TF}$ or not (step S21). If they coincide, the temporary frame $F_{3TT}$ of the third player is commanded to $F_{TF}$ (step S22). The squelching operations of the first and second players are canceled and the third player is squelched (step S23). A check is made to see if the jumping operation of the third player has been finished or not (step S24). If the jumping operation was finished and the pickup reached the target frame, the squelching operation of the third player is canceled (step S25). The squelching operations of all of the three players are canceled and the searching operations are finished. Then, the processing routine advances to the main routine.

Figure 16A:
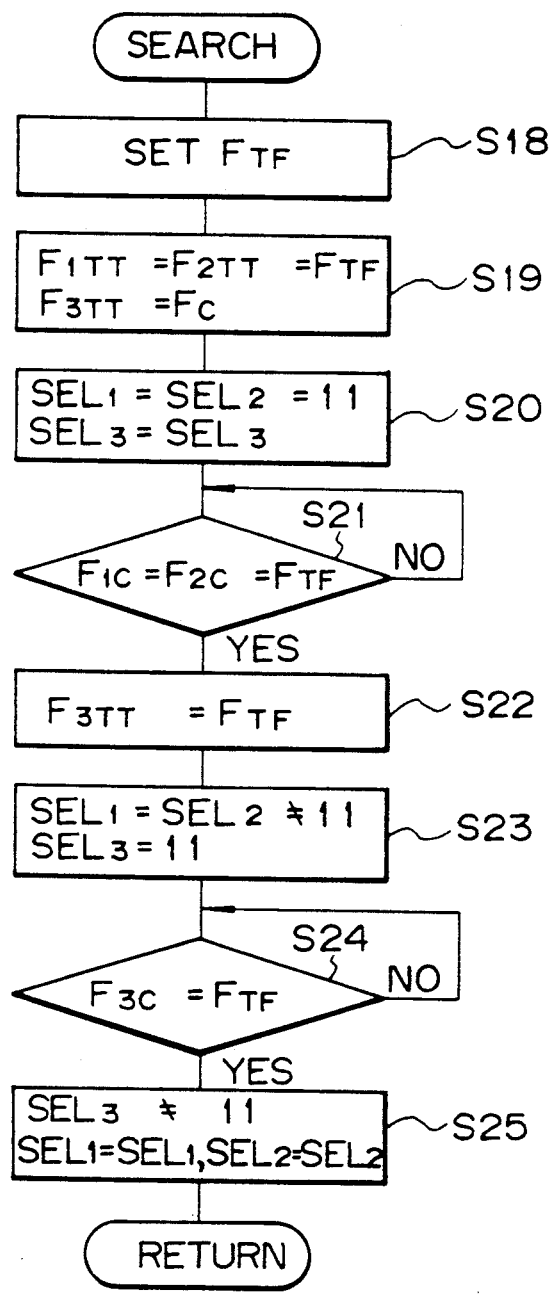
Figure 16B:
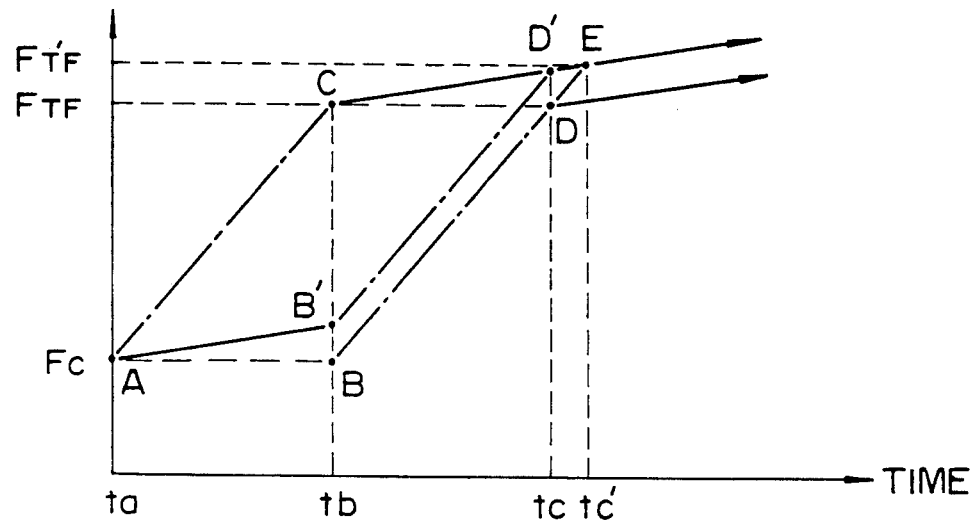
FIGS. 16B, 17B, and 18B are graphs showing movements of a reading point of the player in the reproducing system of FIGS. 8A and 8B.

FIG. 16(b) shows the operations of each player. In FIG. 16, reading points of the first and second players move such that A→C→D and a reading point of the third player moves such that A→B→D.

Although the embodiment has been described with respect to the generation of a still image, it is also possible to reproduce video signals from the players. In this case, the main controller 34 operates in a manner such that a step of instructing the reproduction for the first and second players is executed after step S21, and $F_{3TT}=F_{1C}=F_{2C}$ is set in step S22. Thus, in FIG. 16(b), the reading points of the first and second players move such that A→C→D' and the reading point of the third player moves such that A→B'→D'.

Figure 17B:
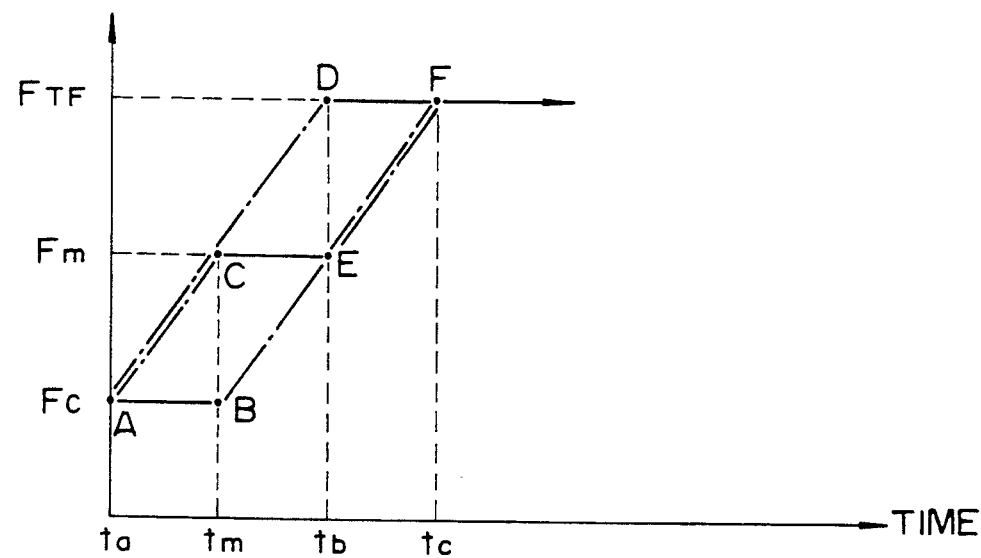
Figure 17A:
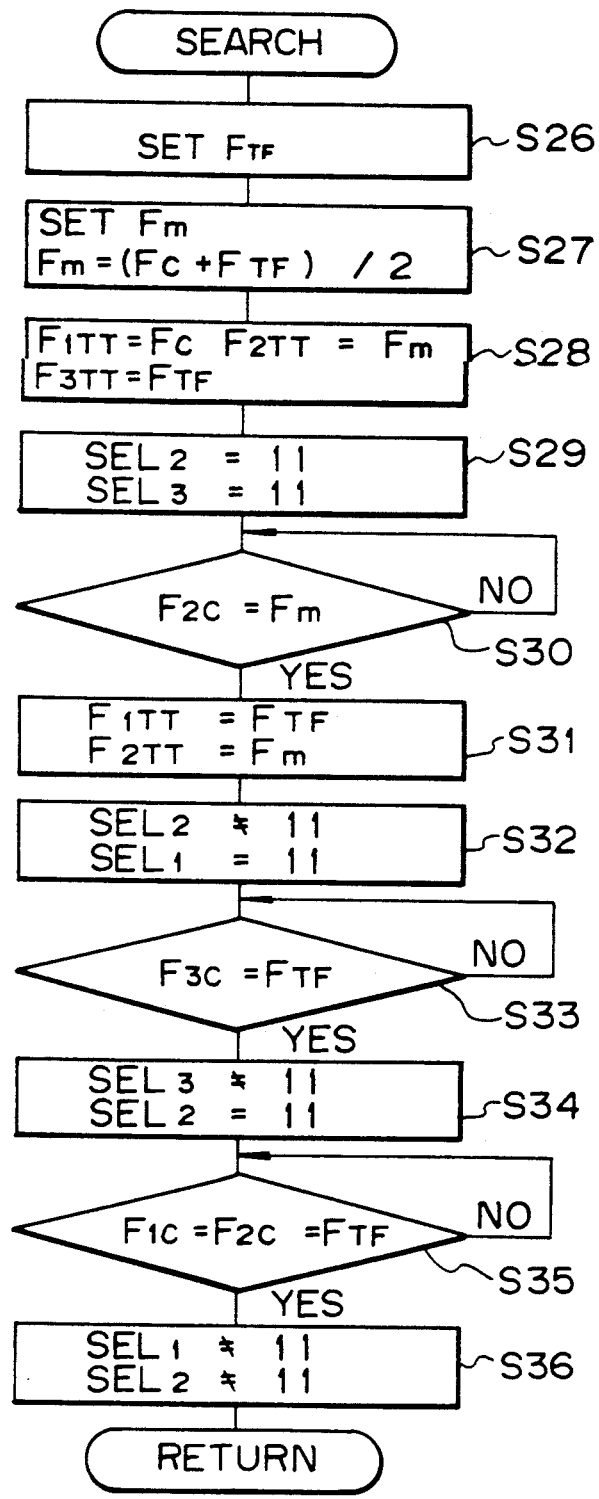

The operations which are executed by the main controller 34 in another embodiment of such an image reproducing search will now be described with reference to FIGS. 17(a) and 17(b). An intermediate frame $F_m$ is set at a center between the target frame $F_{TF}$ and the present frame $F_C$. After the target frame $F_{TF}$ was set (step S26), the intermediate frame $T_m$ is set by a calculation (step S27). The main controller 34 instructs temporary target frames to the players (step S28). The present frame $F_C$ is instructed to the first player. The intermediate frame $F_m$ is instructed to the second player. The target frame $F_{TF}$ is instructed to the third player. Therefore, in FIG. 17(b), the present frame $F_C$ is held in the first player and the reading point is moved such that A→B. The reading point of the second player is moves such that A→C. The reading point of the third player is moved such that A→D. Therefore, the main controller allows only the first player to generate a still image. Accordingly, the second and third players are squelched (step S29). A check is then made to see if the pickup of the second player has reached the intermediate frame $F_m$ or not (step S30). If it has reached $F_m$ at time $t_m$ in FIG. 17(b), the main controller instructs the second player to generate a still image of the frame $F_m$ and instructs the first player to jump the pickup to $F_{TF}$ (step S31). Then, the squelching operation of the second player is canceled and the first player is squelched (step S32). A check is made to see if the pickup of the third player has reached $F_{TF}$ or not (step S33). In FIG. 17(b), the reading point of the first player is moved such that B→E. The reading point of the second player is moved such that C→E. If the pickup of the third player has reached $F_{TF}$ at time $t_b$, the squelching operation of the third player is canceled and the second player is squelched (step S34). Therefore, a still image of the target frame $T_{FT}$ is generated from the third player and the reading point of the third player is moved such that D→F. The reading points of the first and second players are moved such that E→F. A check is made to see if the pickups of the first and second players have reached the target frame $F_{TF}$ or not (step S35). If the pickup of the second player has reached $F_{TF}$ at time $t_c$, the squelching operations of the first and second players are canceled (step S36). All of the squelching operations of three players are canceled and the processing routine advances to the main routine.

When comparing FIGS. 16(a) and 17(b), it will be understood that the time $t_c$ when the pickups of all of the three players reach the target frame $F_{TF}$ is reduced by setting the intermediate frame $F_m$.

Figure 18A:
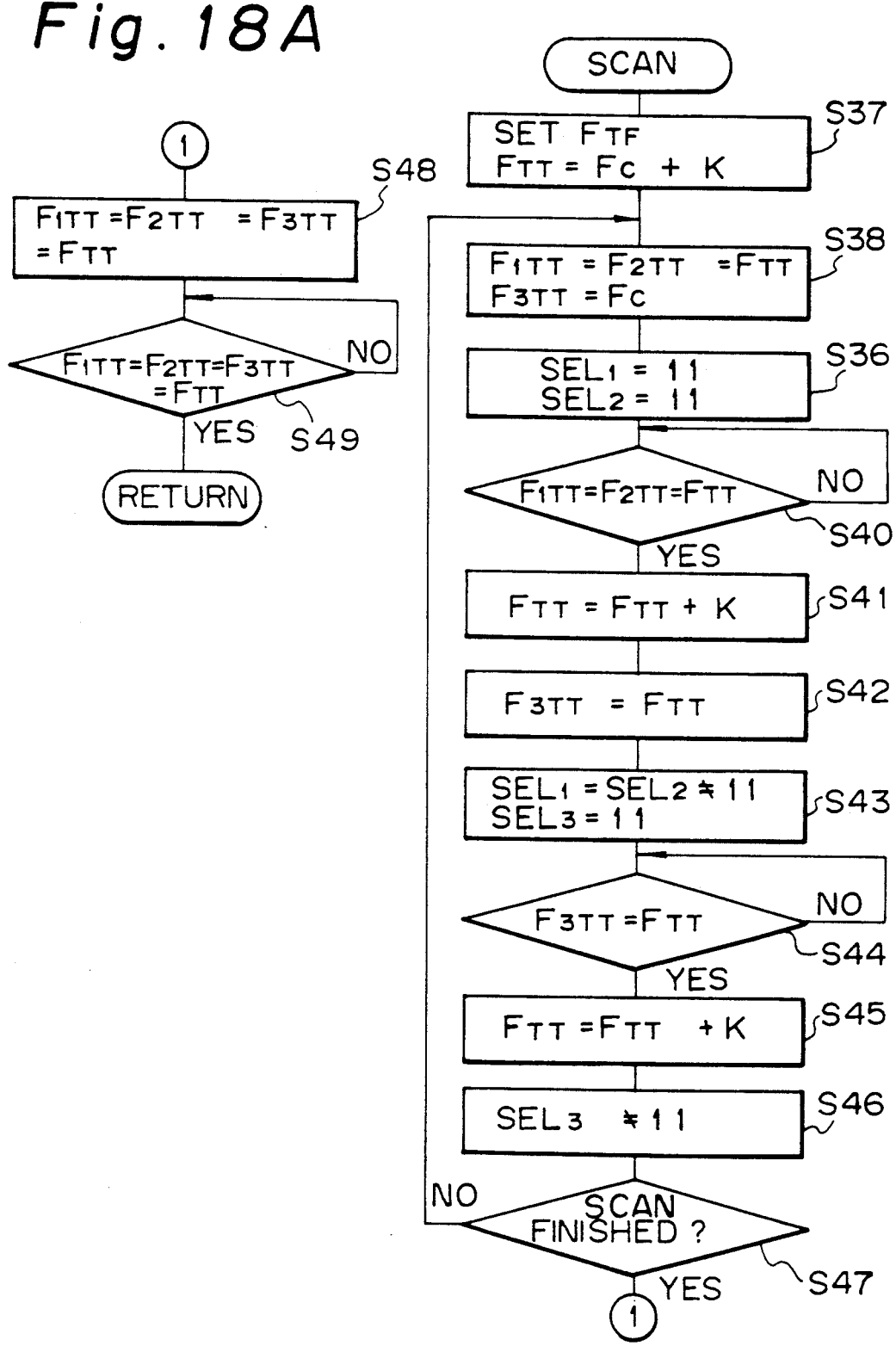

A method of executing the scanning operations by three players will now be described with reference to FIG. 16(a). In FIG. 18(a), when the scanning operations are started, the main controller 34 sets a temporary target frame $F_{TT}$ and the number K of frames to be jumped (step S37). Then, temporary frames $F_{1TT}$ and $F_{2TT}$ of the first and second players are instructed to the temporary target frame $F_{TT}$ and a temporary frame $F_{3TT}$ of the third player is instructed to the present frame $F_C$ (step S38). The first and second players are then squelched (step S39).

Figure 18B:
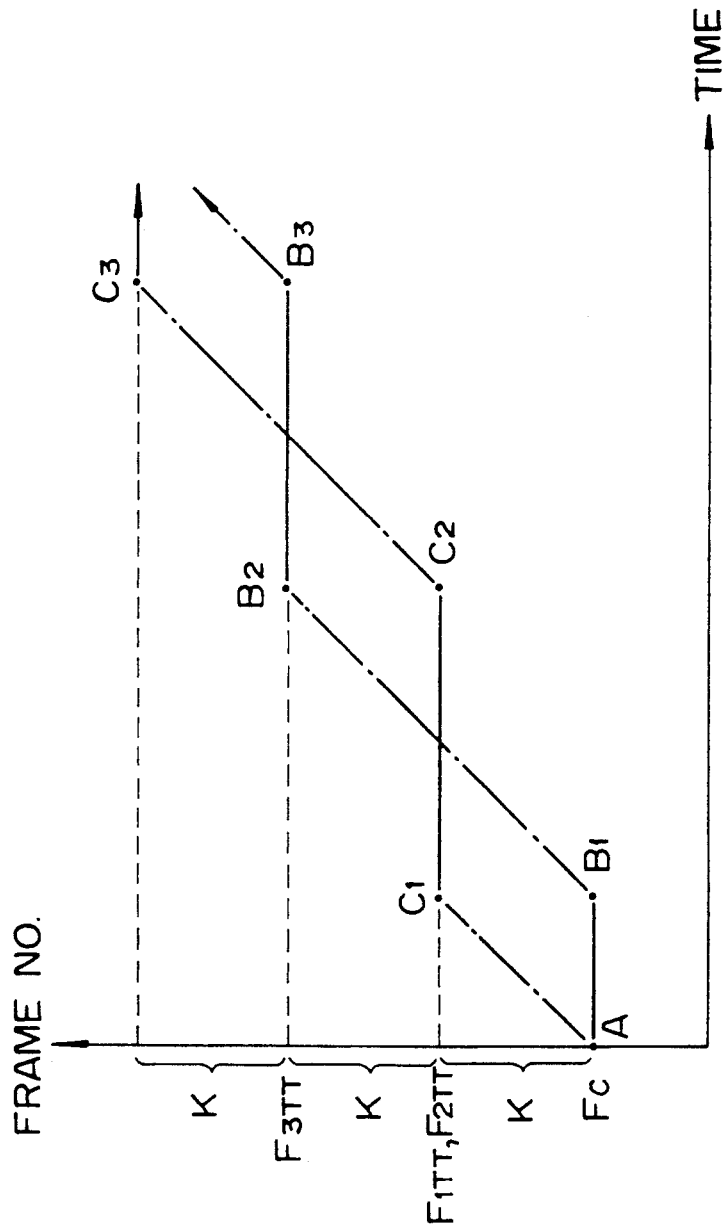

In step S40, a check is made to see if the pickups of the first and second players have reached $F_{TT}$ or not. If they have reached $F_{TT}$, the number K of frames to be jumped next is added to the temporary target frame $F_{TT}$ which has been preset, thereby setting the new temporary target frame $F_{TT}$ (step S41). Then, the temporary frame $F_{3TT}$ of the third player is instructed to the new temporary target frame $F_{TT}$ (step S42). The squelching operations of the first and second players are canceled and the third player is squelched (step S43). A check is then made to see if the pickup of the third player has reached the temporary target frame $F_{TT}$ or not (step S44). If it has reached $F_{TT}$, a new temporary frame is again set (step S45). The squelching operation of the third player is canceled (step S46). Then, a check is made to see if a scan end command by the operation of a command button (not shown) has been received or not (step S47). If it is not received, step S38 follows and the scanning operation is again repeated. If the scan end command has been received, step S48 follows and the same frame $F_{TT}$ is instructed to three players (step S48). A check is made to see if the pickups of all of three players have reached $F_{TT}$ or not (step S49). If they have reached $F_{TT}$, the main routine is executed. At this time, all of the squelching operations are canceled. Although the above description has been made on the assumption of the forward scanning operations, the value of K is set to a negative value in the case of the backward scanning operations. In FIG. 18(b), the reading point of the third player is moved such that $A \to B_1 \to B_2 \to B_3 \ldots$ and the reading points of the first and second players are moved such that $A \to C_1 \to C_2 \to C_3 \ldots$.

The reproduction can be also instructed to the players without instructing the generation of a still image. In this case, in FIG. 18(a), a step of instructing the third player to reproduce is executed after steps S38 and S44 and a step of instructing the first and third players to reproduce is executed after step S40.

In the embodiment, the TBC circuits 29, 30, and 31 execute the squelching operations when the SEL signal is set to $[11]_H$. However, the circuit can be also changed so as to set the levels of the output signals of the TBC circuits 29, 30, and 31 to the highest level $[FF]_H$.

With such a construction, in the case of a special reproducing mode such as search, scan, or the like, the output signal of the player which is executing the reproducing operation is replaced as a reproduction signal of the player which is executing the jumping operation in place of the squelching operation by using a drop-out compensating circuit, thereby compensating.

In FIGS. 8A and 8B, a sync/clock separating circuit 38 is used for the case of displaying the reproduction signal synchronously with the external video apparatus.

An audio selecting circuit 39 selects and outputs two audio channel signals among the audio signals of total six channels which were generated from three players and supplied to the selecting circuit 39 in accordance with a command (AUDIO SFL) from the main controller 34.

If the selected audio signals dropped out due to some reasons, the selecting circuit can automatically switch to the audio signals of the other channel.

In the case of the scanning or searching mode, if the audio signals of the player in the normal playing mode are selected, the audio signals are not extinguished and a soundless state doesn't occur even during the scanning or searching mode.

If a desired audio signal is designated by the operation of a command button (not shown) in the searching operation, the jumping operation can be preferentially performed for the audio designated disc. In this case, in FIG. 16(a), a step of setting the audio designated disc number to M is executed after step S18. In step S19, $F_{MTT}=F_{TT}$ and $F_{LT}=F_C$ ($L \neq M$) are set.

As described above, in the video format signal recording and reproducing method by a plurality of recording media according to the invention, when a plurality of division video signals obtained by dividing a single video format signal are recorded onto a plurality of recording media, the set indication ID signals are recorded, and upon reproduction, he set indication ID signals are automatically discriminated. Therefore, since the reproducing operation is executed only in the case where the set indication ID signals coincide as results of the discriminations, the reproducing operation is performed with respect to only the disks of a correct combination.

What is claimed is:

1. A method of recording and reproducing video format signals, comprising the steps of:
   dividing a single video format signal into a plurality of division video signals;
   recording each of said division video signals, along with a table of contents and a unique identification signal, onto each in a set of recording media;
   simultaneously playing said set of recording media, thereby reading out said table of contents and said unique identification signals;
   determining whether each of said unique identification signals coincide with one of stored preceding identification signals;
   performing the following steps when one of said unique identification signals does not coincide with one of said stored preceding identification signals;
   reading said table of contents from each of said set of recording media,
   stopping playing of said set of recording media if all of said table of contents read from said set of recording media do not coincide, and
   replacing said stored preceding identification signals with said unique identification signals if all of said table of contents read from said set of recording media do coincide; and reproducing said division video signals comprising the steps of:

deriving said division video signals from said set of recording media, synthesizing said derived division signals into said single video format signal, and displaying said single video format signal.

2. A method according to claim 1, wherein said recording medium is a disk and the set indication identification signal is recorded in an innermost rim portion of the disk.

3. A method as recited in claim 1, wherein said reproducing step further comprises the step of ordering said set of recording media for correct reproduction of said single video format signal.

4. A method as recited in claim 1, wherein said set of recording media contains three recording medias further comprising, prior to said simultaneously playing step, the steps of:

inputting a target frame to be reproduced;

calculating an intermediate frame equal to a frame centrally between said target frame and a present frame;

maintaining a first reading point of said present frame on a first recording media;

moving a second reading point to said intermediate frame on a second recording media;

moving a third reading point to said target frame on a third recording media;

when said second reading point is located at said intermediate frame, moving said first reading point to said intermediate frame; and when said third reading point is located at said target frame, moving said first and second reading points to said target frame.

5. A method as recited in claim 4, further comprising the steps of:

generating an image from any of said set of recording media when a corresponding recording point is not moving; and squelching image generation of any of said set of recording media when a corresponding reading point is moving.

\* \* \* \* \*